(12) United States Patent
Fujio et al.

(10) Patent No.: US 8,029,374 B2
(45) Date of Patent: Oct. 4, 2011

(54) FIXED CONSTANT-VELOCITY UNIVERSAL JOINT

(75) Inventors: Teruaki Fujio, Iwata (JP); Manabu Hoshino, Iwata (JP); Tohru Nakagawa, Iwata (JP); Wasaburo Suganuma, Iwata (JP)

(73) Assignee: NTN Corporation, Osaka (JP)

( * ) Notice: Subject to any disclaimer, the term of this patent is extended or adjusted under 35 U.S.C. 154(b) by 315 days.

(21) Appl. No.: 12/310,903

(22) PCT Filed: Sep. 4, 2007

(86) PCT No.: PCT/JP2007/067191
§ 371 (c)(1),
(2), (4) Date: Mar. 12, 2009

(87) PCT Pub. No.: WO2008/032600
PCT Pub. Date: Mar. 20, 2008

(65) Prior Publication Data
US 2010/0029396 A1    Feb. 4, 2010

(30) Foreign Application Priority Data

Sep. 14, 2006  (JP) ................. 2006-249849
Sep. 14, 2006  (JP) ................. 2006-249854
Sep. 14, 2006  (JP) ................. 2006-249856

(51) Int. Cl.
*F16D 3/224* (2011.01)
(52) U.S. Cl. .................... 464/145; 464/906
(58) Field of Classification Search ............. 464/141, 464/145, 906
See application file for complete search history.

(56) References Cited

U.S. PATENT DOCUMENTS 3,553,979 A * 1/1971 Noguchi et al. ............ 464/145
(Continued)

FOREIGN PATENT DOCUMENTS

EP  0 950 824    10/1999
(Continued)

OTHER PUBLICATIONS

International Preliminary Report on Patentability and Written Opinion of the International Searching Authority mailed Mar. 17, 2009 for International Application No. PCT/JP2007/067191.

(Continued)

*Primary Examiner* — Gregory Binda
(74) *Attorney, Agent, or Firm* — Wenderoth, Lind & Ponack, L.L.P.

(57) ABSTRACT

A fixed constant velocity universal joint is made compact, has little decrease in load capacity even when the fixed constant velocity universal joint is made compact and is at an operating angle, and has improved high angle strength and durability through lessening instances in which a ball runs over a track at a high angle. In the fixed constant velocity universal joint, a cage includes four pockets, the pockets including a pair of long pockets of which a circumferential direction spacing is wide and a pair of short pockets of which the circumferential direction spacing is narrow. The pair of long pockets are shifted by 180 degrees along a circumferential direction and the pair of short pockets are shifted by 180 degrees along the circumferential direction. As a result, the long pockets and the short pockets are alternately disposed along the circumferential direction. A long pocket houses two balls. A short pocket houses one ball. Two ball housing sections connected by a slit are formed in the long pocket by projections that project towards a long pocket inner side being provided on opposing long sides of the long pocket.

20 Claims, 26 Drawing Sheets

U.S. PATENT DOCUMENTS

| | | | |
|---|---|---|---|
| 6,299,542 | B1 | 10/2001 | Ouchi et al. |
| 6,478,683 | B1 | 11/2002 | Ouchi et al. |
| 2009/0054166 | A1* | 2/2009 | Hoshino et al. ............... 464/145 |

FOREIGN PATENT DOCUMENTS

| | | |
|---|---|---|
| GB | 1 537 067 | 12/1978 |
| JP | 48-21363 | 6/1973 |
| JP | 58-65428 | 5/1983 |
| JP | 11-303882 | 11/1999 |

OTHER PUBLICATIONS

International Search Report mailed Oct. 9, 2007 for International Application No. PCT/JP2007/067191.

Chinese Office Action issued Dec. 31, 2010 in corresponding Chinese Application No. 200780034270.2 w/English translation.

* cited by examiner

FIXED CONSTANT-VELOCITY UNIVERSAL JOINT

TECHNICAL FIELD

The present invention relates to a fixed constant velocity universal joint used in a power transmission system of automobiles and various industrial machineries. The fixed constant velocity universal joint allows angular displacement between two axes on a driving side and a driven side.

BACKGROUND ART

A fixed constant velocity universal joint is a kind of constant velocity universal joint that is, for example, used as a means for transmitting rotational force from an engine to wheels of an automobile at a constant speed. The fixed constant velocity universal joint has a configuration in which two axes on a driving side and a driven side are connected, and rotational torque can be transmitted at a constant speed even when the two axes are at an operating angle. In general, a Birfield-type (BJ) and an undercut-free type (UJ) are widely known as the fixed constant velocity universal joint described above.

For example, the UJ-type fixed constant velocity universal joint includes an outer ring 3 serving as an outer member, an inner ring 6 serving as an inner member, a plurality of balls 7, and a cage 8, as shown in FIG. 41 and FIG. 42. A plurality of track grooves 2 are formed on an inner spherical surface 1 of the outer ring 3, running along an axial direction and evenly spaced in a circumferential direction. A plurality of track grooves 5 are formed on an outer spherical surface of 4 of the inner ring 6, running along an axial direction and evenly spaced in a circumferential direction. The track grooves 5 form pairs with the track grooves 2 on the outer ring 3. The balls 7 are interposed between the track grooves 2 on the outer ring 3 and the track grooves 5 on the inner ring 6 and transmit torque. The cage 8 is interposed between the inner spherical surface 1 of the outer ring 3 and the outer spherical surface 4 of the inner ring 6 and holds the balls 7. A plurality of pockets 9 housing the balls 7 are disposed in the cage 8 along the circumferential direction.

A track groove 2 on the outer ring 3 is composed of an inner side track groove 2a and an opening side track groove 2b. The inner side track groove 2a has a track groove bottom that is an arc section. The opening side track groove 2b has a track groove bottom that is a straight section parallel with an outer ring axial line. A center of curvature O1 of the inner side track groove 2a is shifted in an axial direction, from a joint center O towards an opening side of the outer ring 3. A track groove 5 on the inner ring 6 is composed of an inner side track groove 5a and an opening side track groove 5b. The inner side track groove 5a has a track groove bottom that is a straight section parallel to an inner ring axial line. The opening side track groove 5b has a track groove bottom that is an arc section. A center of curvature O2 of the opening side track groove 5b is provided separated from the joint center in an axial direction by an equal distance k in an inward direction on a side opposite of the center of curvature O1 of the inner side track groove 2a on the outer ring 3.

A curvature radius O3 of a cage outer spherical surface 8a is shifted in an axial direction, from the joint center O to an opening side of the cage 8. A center of curvature O4 of a cage inner spherical surface 8b is provided separated from the joint center O in the axial direction by an equal distance k1 in an inward direction on a side opposite of the center of curvature O3 of the cage outer spherical surface 8a. Conventionally, in this type of constant velocity universal joint, track offset amounts of the inner and outer rings are large, and an offset amount of the cage is small. A pitch angle of two adjacent balls 7 is 60 degrees, as shown in FIG. 42. In other words, six balls 7 are disposed along the circumferential direction at a pitch of 60 degrees.

In recent years, demands are being made for a fixed velocity universal joint that is more compact and has increased torque load capacity. As a method of reducing the size and increasing the torque load capacity of the fixed constant velocity universal gear having six balls, balls that are as large as possible being disposed on a pitch circle diameter (PCD) that is as small as possible can be considered. However, when large balls are used, columns (window columns) between the pockets in the cage become narrow. Rigidity of the cage deteriorates. Torsional torque load at a high angle particularly contributes to deterioration of strength of the constant velocity universal joint because damage to the cage occurs more easily.

In particular, as shown in FIG. 41, when the track offset amounts of the inner and outer rings are large and the offset amount of the cage is small, a track groove depth on an outer ring inner side becomes shallow, and the torque load capacity at a high angle decreases. In other words, the ball easily runs over a track edge in relation to the torque load at a high angle, generating excessive stress in an edge section. Therefore, damage caused by a chip in the edge section and a locking phenomenon with the cage caused by plastic deformation occur. Such damage and locking phenomenon contributes to cage damage by degrading workability and reducing durability life. Moreover, a track depth on an inner side becomes shallow in the inner ring as well, and disadvantages similar to those of the outer ring occur. Therefore, improvement of joint strength and durability at a high angle range has been an issue since the past.

Conventionally, durability of an overall constant velocity universal joint is achieved through securement of cage durability being achieved by an increase in a circumferential direction length dimension of a column section present between pockets adjacent in a circumferential direction (Patent Document 1). In other words, in an invention described in Patent Document 1, space between balls housed within a same pocket is reduced by a plurality of balls being housed in a single pocket. As a result, the circumferential direction length dimension of the column section present between the pockets adjacent in the circumferential direction is increased. The number of balls is seven or more.

Conventionally, there is a fixed constant velocity universal joint in which two balls are housed in each pocket in the cage, and periodic change in moment during rotation is controlled (Patent Document 2). In other words, in an invention described in Patent Document 2, a circumferential direction length of a single window column is increased with all pockets in the cage serving as a long window with wide circumferential direction spacing between the pockets.

Patent Document 1: Japanese Patent Laid-open Publication No. Heisei 11-303882

Patent Document 2: United Kingdom Patent No. 1537067

SUMMARY OF THE INVENTION

Problems to be Solved by the Invention

In the invention described in Patent Document 1, durability of the overall constant velocity universal joint is achieved through securement of cage durability being achieved by an increase in the circumferential direction length dimension of the column section present between pockets adjacent in the circumferential direction, through a plurality of balls being housed in a single pocket. However, the invention in Patent Document 1 is achieved under a premise that the number of balls is seven or more. Therefore, the invention does not prevent decrease in load capacity at a high angle, prevent increase in contact surface pressure between the inner ring and the cage inner spherical surface, or the like with regard to a constant velocity universal joint having six balls.

In the invention in Patent Document 2, two balls are housed in each pocket of the cage, thereby reducing the overall number of pockets and increasing the circumferential direction length of the window column in a manner similar to that in Patent Document 1. Therefore, in this instance as well, the invention does not prevent decrease in load capacity at a high angle, prevent increase in contact surface pressure between the inner ring and the cage inner spherical surface, or the like.

In light of the above-described issues, the present invention provides a fixed constant velocity universal joint that can be made compact, has little decrease in load capacity even when the fixed constant velocity universal joint is made compact and is at an operating angle, and can improve high angle strength and durability through lessening insane in which a ball runs over a track at a high angle.

Means for Solving the Problems

A first aspect of the invention is a fixed constant velocity universal joint including an outer member on which a plurality of track grooves are formed on an inner spherical surface, an inner member on which a plurality of track grooves are formed on an outer spherical surface, a plurality of balls that are interposed between the track grooves on the outer member and the track grooves on the inner member and transmit torque, and a cage that has pockets housing the balls and is interposed between the outer member and the inner member. In the fixed constant velocity universal joint, the cage has four pockets that are a pair of long pockets of which a circumferential direction spacing is wide and a pair of short pockets of which a circumferential direction spacing is narrow. The pair of long pockets are shifted by 180 degrees along a circumferential direction, and the pair of short pockets are shifted by 180 degrees along the circumferential direction. The long pockets and the short pockets are alternately disposed along the circumferential direction. A long pocket houses two balls, and a short pocket houses one ball. Two ball housing sections are formed by a projection that projects in a long pocket inward direction being provided on at least one long side, between long sides of the long pocket that oppose each other.

In the fixed constant velocity universal joint, a number of window columns provided between the pockets in the cage is four, and the long pockets are provided. As a result, mounting of the inner member to the cage is facilitated. As a result of the projection being provided, rigidity of frames (window frames) used to form the long pockets can be improved.

A second aspect of the invention is the first aspect of the invention, in which the projection is provided on a long side on a joint opening side. In this case, when the fixed constant velocity universal joint is at an operating angle, interference between an inner circumferential edge of an opening (entrance) of the outer member and a pocket edge on a cage outer spherical surface side can be delayed or prevented.

A third aspect of the invention is the first aspect of the invention, in which the projection is provided on a long side on a joint inner side. In this case, when the fixed constant velocity universal joint is at an operating angle, interference between an inner edge of the outer spherical surface of the inner member and a pocket edge on a cage inner spherical surface side can be delayed or prevented.

A fourth aspect of the invention is the first aspect of invention, in which a chamfer section is formed on at least one of edges of the long pocket on a cage outer spherical surface side and a cage inner spherical surface side.

When the chamfer section provided on the long pocket is formed on an edge on the cage outer spherical surface side on the joint opening side, when the fixed constant velocity universal joint is at an operating angle, the pocket edge on the cage outer spherical surface side does not interfere with the inner circumferential edge of the opening (entrance) of the outer member. When the chamfer section provided on the long pocket is formed on an edge on the cage inner spherical surface side on the joint inner side, when the fixed constant velocity universal joint is at an operating angle, the pocket edge on a cage inner spherical surface side does not interfere with the inner edge of the outer spherical surface of the inner member.

A fifth aspect of the invention is the fourth aspect of the invention, in which the chamfer section is formed along an overall periphery of the long pocket. In this case, when the chamfer section is formed on the pocket edge on the cage outer spherical surface side, the chamfer section is formed along an overall periphery on the cage outer spherical surface side. When the chamfer section is formed on the pocket edge on the cage inner spherical surface side, the chamfer section is formed along an overall periphery on the cage inner spherical surface side.

A sixth aspect of the invention is the fourth aspect of the invention, in which the chamfer section is formed only on a long-side side of the long pocket. In this case, when the chamfer section is formed on the pocket edge on the cage outer spherical surface side, the chamfer section is formed on the long-side side on the cage outer spherical surface side. When the chamfer section is formed on the pocket edge on the cage inner spherical surface side, the chamfer section is formed on the long-side side on the cage inner spherical surface side.

A seventh aspect of the invention is the first aspect of invention, in which a notched section that is not in contact with the inner spherical surface of the outer member is provided on the cage outer spherical surface.

As a result of the notched section that is not in contact with the inner spherical surface of the outer member being provided on the cage outer spherical surface, when the fixed constant velocity universal joint is at an operating angle, interference between the inner circumferential edge of the opening (entrance) of the outer member and the pocket edge on the cage outer spherical surface side can be avoided.

An eighth aspect of the invention is the first aspect of the invention, in which an arc section that is continuous in a circumferential direction is formed on an end of the outer spherical surface of the inner member on a joint inner side, in at least a region corresponding with the long pocket.

As a result of the arc section that is continuous in the circumferential direction being formed on the end of the outer spherical surface of the inner member on the joint inner side in this way, the outer spherical surface of the inner member and the cage inner spherical surface can be in continuous contact at a high operating angle.

Moreover, because the outer spherical surface of the inner member and the cage inner spherical surface are in continuous contact, contact area between the outer spherical surface of the inner member and the cage inner spherical surface increases. Contact surface pressure at this section can be reduced. Therefore, friction, galling, burning, and the like can be prevented from occurring. As a result, malfunction of the joint, damage, temperature increase, burning, abnormal noises, and the like can be prevented.

Furthermore, because the outer spherical surface of the inner member and the cage inner spherical surface are in contact at a high operating angle, operational abnormalities and chipping of the edge of the window frame caused by interference between the edge (inner side edge) of the inner member and the pocket frame (window frame) can be prevented. Damage at an early stage caused by operation malfunction of the joint and the cage chipping can be prevented.

A ninth aspect of the invention is the eighth aspect of the invention, in which the arc section continues over an overall periphery of the inner member in a circumferential direction.

A tenth aspect of the invention is the first to ninth aspects of the invention, in which a pitch angle on PCD of the two balls housed in the long pocket is less than 60 degrees, and a pitch angle of other balls is greater than 60 degrees.

As a result, an inter-pitch distance of the two balls housed in the long pocket can be shortened, and an inter-pitch distance of the corresponding track grooves on the outer member can be shortened. A circumferential direction length of a single cage window column at the section in which the inter-pitch distance of the balls is increased can be lengthened. As a result, rigidity of each cage window column can be increased.

An eleventh aspect of the invention is the first to tenth aspects of the invention, in which an axial direction length of the inner member is shorter than a circumferential direction spacing of the long pockets. As a result, mounting of the inner member to the cage can be further facilitated.

A twelfth aspect of the invention is the first to eleventh aspects of the invention, in which a shoulder width dimension between two track grooves on the outer member corresponding to the long pockets in the cage is set to be smaller than a pocket width in a cage axial direction. As a result, mounting of the cage to the outer member can be facilitated.

A thirteenth aspect of the invention is the first to twelfth aspect of the invention, in which a center of curvature of a track groove on the outer member and a center of curvature of a track groove on the inner member are offset from a joint center in opposite axial directions by an equal distance. A center of curvature of the outer spherical surface of the cage and a center of curvature of the inner spherical surface of the cage are offset from the joint center in opposite axial directions by an equal distance. An offset amount of the cage is made large to be almost the same as an offset amount of the track grooves. As a result, track groove depth on the joint inner side can be prevented from becoming shallow, and a thickness of the cage on an opening side (radial direction thickness) can be increased.

A fixed constant velocity universal joint in which the track grooves on the inner member and the outer member include an arc section and a straight section can be used. Alternatively, a fixed constant velocity universal joint in which the track grooves on the inner member and the outer member include an arc section and a tapered section can be used.

Advantage of the Invention

In the present invention, the rigidity of each cage window column can be increased. Therefore, large balls can be disposed in a small pitch circle diameter (PCD). Size reduction can be achieved without reducing load capacity. Moreover, damage to the cage in relation to torsional torque at a high angle can be prevented. In addition, as a result of the long pockets being provided, mounting of the inner member to the cage can be facilitated. In particular, as a result of the axial direction length of the inner member being shorter than a shortest length of the circumferential direction spacing of the long pockets, the mounting of the inner member to the cage can be further facilitated, thereby improving mounting operability.

As a result of the projection being provided, the rigidity of the frames (window frames) used to form the pockets can be improved. As a result, deformation of the cage due to insufficient rigidity in the window frames can be prevented. Workability of the joint does not deteriorate. Stable workability can be achieved for a long period of time. Furthermore, as a result of the projection being provided, the contact area between the outer member and the inner member can be increased. Heat generation during sliding can be suppressed, and damage to the joint at an early stage can be prevented.

When the projection is provided on the long side on the joint opening side, the interference between the inner circumferential edge at the opening (entrance) of the outer member and the pocket edge on the cage outer spherical surface side can be delayed or prevented. When the projection is provided on the long side on the joint inner side, the interference between the inner edge of the outer spherical surface of the inner member and the pocket edge on the cage inner spherical surface side can be delayed or prevented. Therefore, guidance of the cage to the inner spherical surface of the outer member and the outer spherical surface of the inner member can be facilitated. Deterioration in the workability of the joint can be prevented. In accompaniment with the prevention of deterioration in the workability of the joint as a result of improved rigidity of the window frames, chipping and cracking of the cage can be effectively prevented.

Furthermore, the inter-pitch distance between the two balls housed in the long pocket can be decreased, and the inter-pitch distance between the corresponding track grooves on the outer member can be decreased. As a result, mounting of the cage to the outer member can be facilitated. In particular, the inter-pitch distance (shoulder width dimension between track grooves) can be made smaller than the pocket width in the cage axial direction. As a result, the mounting of the cage to the outer member can be further facilitated, and mounting operability can be improved.

The offset amount of the cage is made large to become almost the same as the offset amounts of the track grooves. Therefore, the track groove depth on the joint inner side can be prevented from becoming shallow, and the thickness of the cage on the opening side (radial direction thickness) can be increased. As a result, the balls can be prevented from running over a track edge at a high angle, and excessive stress is not placed on the edge. In other words, decrease in torsional torque load capacity at a high angle can be prevented. An improvement in high angle durability life and an improvement (modification) in damage strength caused by plastic deformation of the track grooves in the inner member and the outer member at a high angle can be achieved.

The thickness (radial direction thickness) of the cage on the joint opening side can be increased. Therefore, rigidity of a cage window frame on the joint opening side can be increased. As a result, in accompaniment with the increase in the rigidity of each cage window column, significant improvement in cage damage strength in relation to torsional torque at a high angle can be achieved.

When two balls are housed in the long pocket, the window column is not present between the balls. Therefore, the rigidity of the window frame on the joint opening side receiving a large load from the balls is required to be increases. However, as described above, because the offset amount of the cage is increased to be almost the same as the offset amounts of the track grooves, the rigidity of the window frame on the joint opening side can be increased. Strength of the cage can be sufficiently maintained, even in a configuration in which two balls are housed in the long pocket.

BRIEF DESCRIPTION OF THE DRAWINGS

FIG. 12A is a side view of a first modified example of the cage in which a projection has an arc section; FIG. 12B is a side view of a second modified example of the cage in which side surfaces of the projection and a pocket long side form a right angle; and FIG. 12C is a side view of a third modified example of the cage in which the side surfaces of the projection are angled surfaces;

DETAILED DESCRIPTION OF THE INVENTION

A basic embodiment of the present invention will be described hereafter with reference to FIG. 1 to FIG. 19. Three modified embodiments will thereafter be described with reference to FIG. 20 to FIG. 28, FIG. 29 to FIG. 30, and FIG. 31 to FIG. 40.

Figure 1:
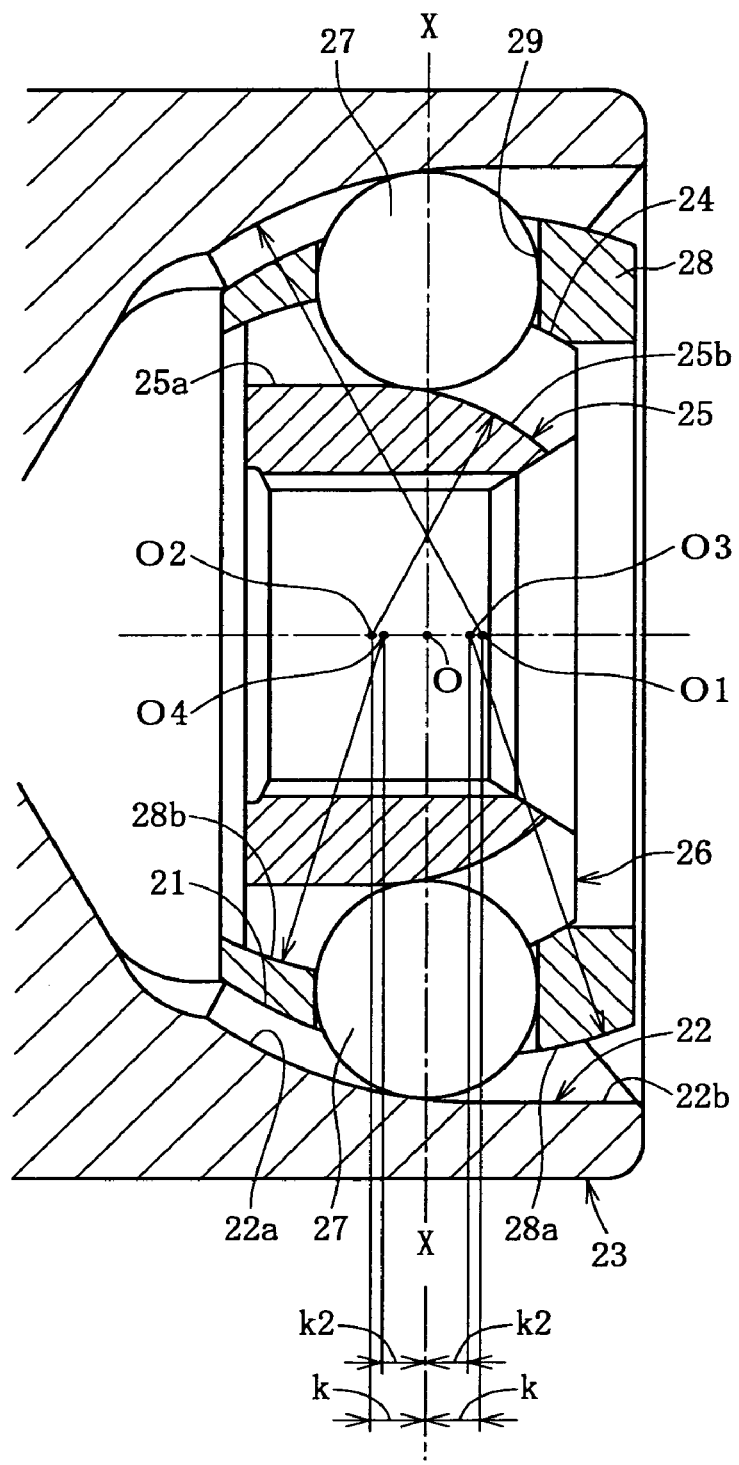
FIG. 1 is a cross-sectional view of a fixed constant velocity universal joint according to an embodiment of the present invention.

As shown in FIG. 1, a fixed constant velocity universal joint according to the basic embodiment includes an outer ring 23, an inner ring 26, a plurality of balls 27, and a cage 28. The outer ring 23 serves as an outer member in which a plurality of track grooves 22 are formed on an inner spherical surface 21 along an axial direction, unevenly spaced in a circumferential direction. The inner ring 26 serves as an inner member in which a plurality of track grooves 25 paired with the track grooves 22 on the outer ring 23 are formed on an outer spherical surface 24 along an axial direction, unevenly spaced in a circumferential direction. The balls 27 are interposed between the track grooves 22 of the outer ring 23 and the track grooves 25 of the inner ring 26 and transmit torque. The cage 28 is interposed between the inner spherical surface 21 of the outer ring 23 and the outer spherical surface 24 of the inner ring 26 and holds the balls 27.

A track groove 22 on the outer ring 23 is composed of an inner side track groove 22a and an opening side track groove 22b. The inner side track groove 22a has a track groove bottom that is an arc section. The opening side track groove 22b has a track groove bottom that is a straight section parallel with an outer ring axial line. A center of curvature O1 of the inner side track groove 22a is shifted in an axial direction, from a joint center O towards an opening side of the outer ring 23. A track groove 25 on the inner ring 26 is composed of an inner side track groove 25a and an opening side track groove 25b. The inner side track groove 25a has a track groove bottom that is a straight section parallel to an inner ring axial line. The opening side track groove 25b has a track groove bottom that is an arc section. A center of curvature O2 of the opening track groove 25b is provided separated from the joint center O in an axial direction by an equal distance k in an inward direction on a side opposite of the center of curvature O1 of the inner side track groove 22a of the outer ring 23.

In the cage 28, a center of curvature O3 of an outer spherical surface 28a and a center of curvature O4 of an inner spherical surface 28b are offset from the joint center (cage center) O in opposite axial directions by an equal distance k2. An offset amount of the cage 28 is made large to be almost the same as an offset amount of the track grooves.

Therefore, the outer spherical surface 28a of the cage 28 can form an arc (concentric arc having a different curvature radius) that is almost concentric with the groove bottom of the inner side track groove 22a in the outer ring 23. Track groove depth on a joint inner side can be prevented from becoming shallow. In addition, a thickness of the cage 28 on an opening side (radial direction thickness) can be increased.

Figure 2:
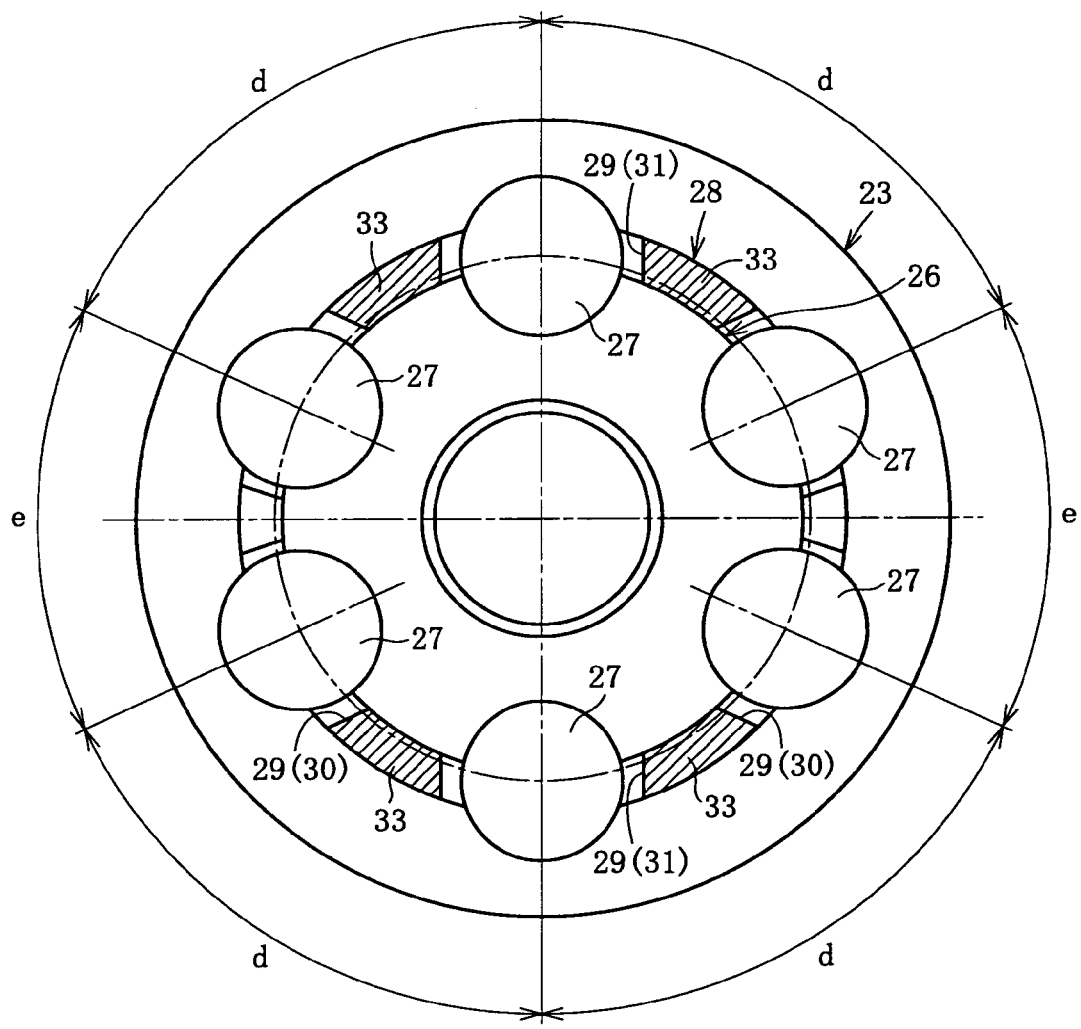
FIG. 2 is a cross-sectional view of main sections of the fixed constant velocity universal joint.

Pockets 29 for housing the balls 27 are provided in the cage 28. In this case, as shown in FIG. 2, four pockets 29 are provided in the cage 28, the pockets 29 being a pair of long pockets 30 of which circumferential direction spacing is wide and a pair of short pockets 31 of which circumferential direction spacing is narrow. The pair of long pockets 30 are shifted by 180 degrees along the circumferential direction, and the pair of short pockets 31 are shifted by 180 degrees along the circumferential direction. The long pockets 30 and the short pockets 31 are alternately disposed along the circumferential direction. Therefore, four window columns (cage window columns) are provided between the pockets. A long pocket 30 stores two balls 27, and a short pocket 31 stores one ball 27.

Figure 7:
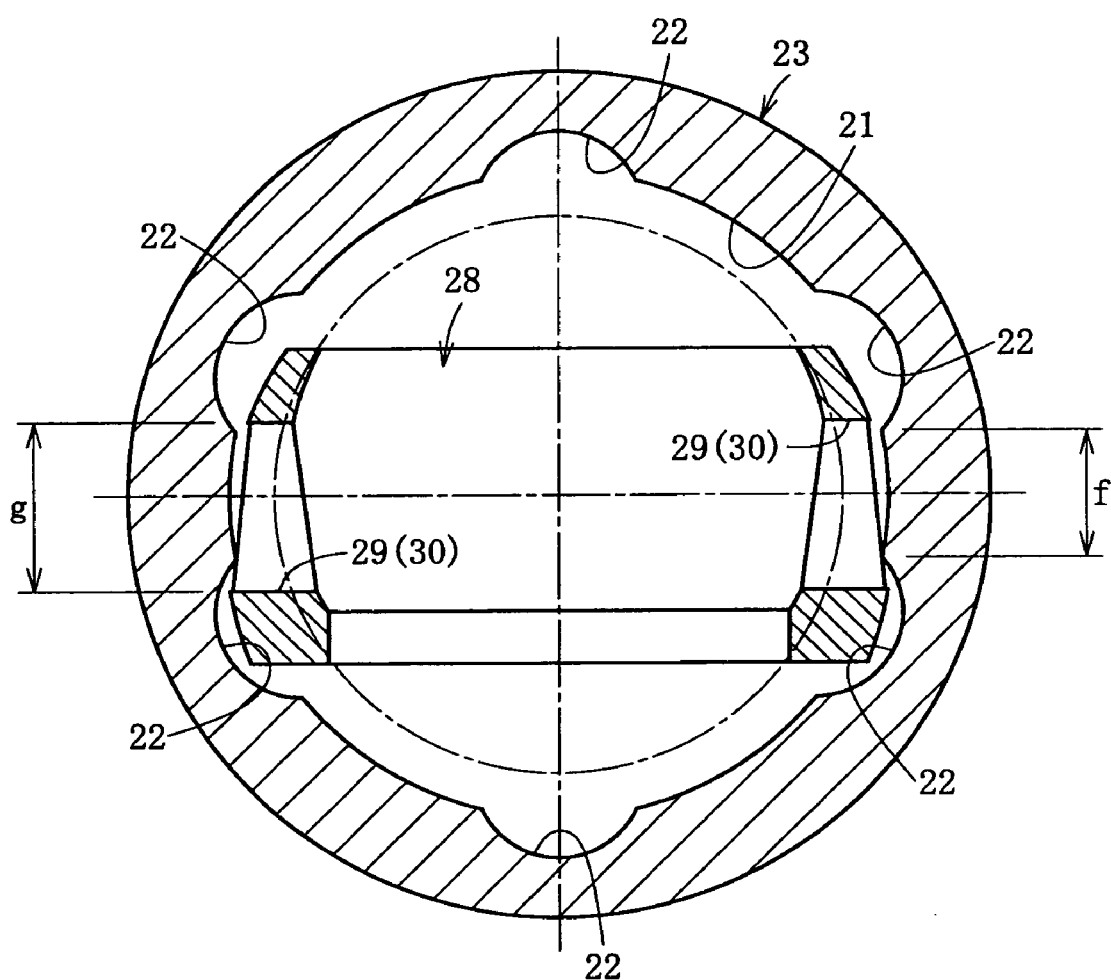
FIG. 7 is a cross-sectional view of a relationship between an outer ring and the cage in the fixed constant velocity universal joint.

A pitch angle e on PCD of the two balls 27 housed in the long pocket 30 is less than 60 degrees. In addition, a pitch angle d of other balls 27 is greater than 60 degrees. An axial direction length i (see FIG. 6) of the inner ring 26 is shorter than a circumferential direction spacing h (see FIG. 5) of the long pockets 30. Furthermore, as shown in FIG. 7, a shoulder width f between two track grooves in the outer ring 23 corresponding to the long pockets 30 in the cage 28 are set to be shorter than a pocket width g in a cage axial direction.

Figure 3:
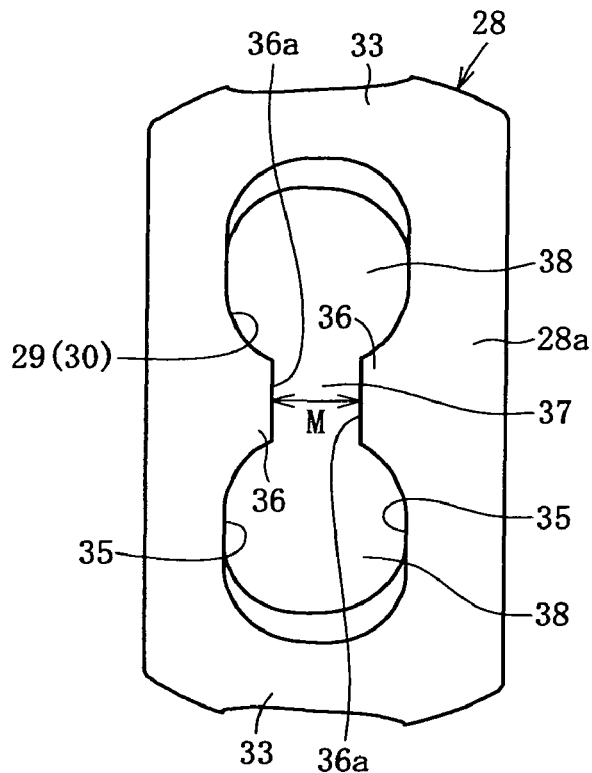
FIG. 3 is a side view of a cage in the fixed constant velocity universal joint.
Figure 4:
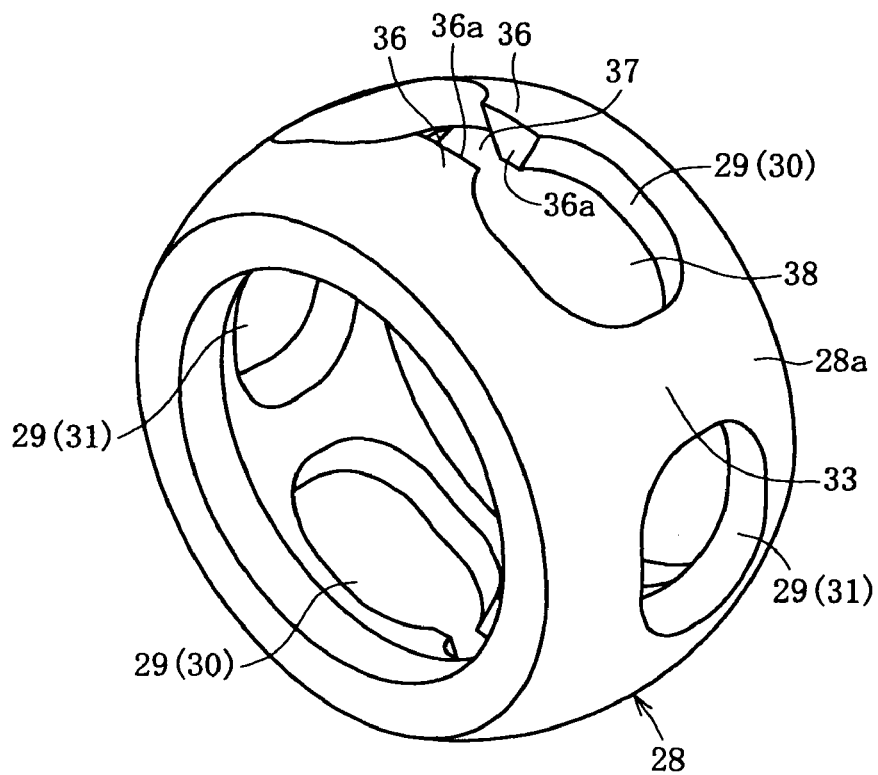
FIG. 4 is a perspective view of the cage in the fixed constant velocity universal joint.
Figure 5:
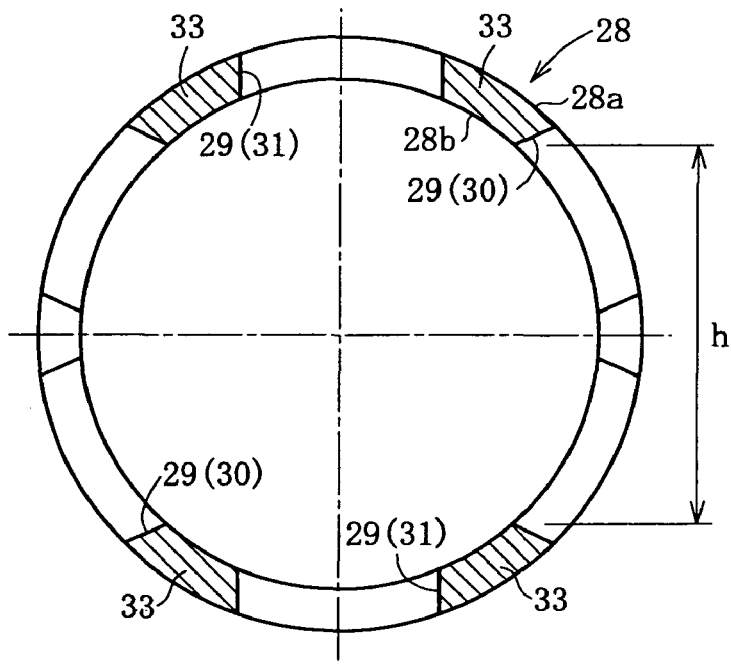
FIG. 5 is a cross-sectional view of the cage in the fixed constant velocity universal joint.
Figure 6:
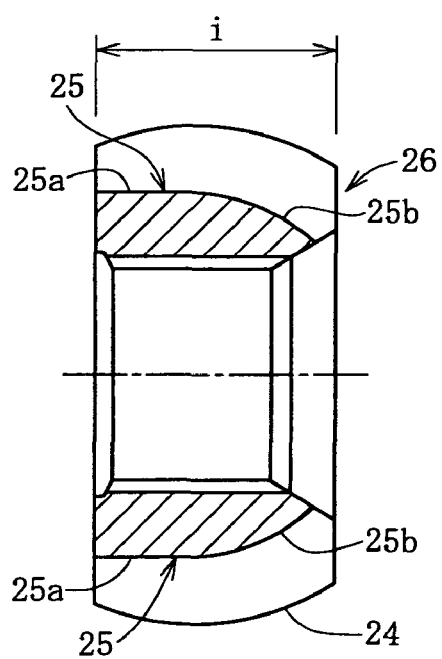
FIG. 6 is a cross-sectional view of an inner ring in the fixed constant velocity universal joint.

As shown in FIG. 3 and FIG. 4, the long pocket 30 is provided with projections 36 and 36 that project in a long pocket inward direction, at a longitudinal direction center of long sides 35 and 35 of the long pocket 30. The long sides 35 and 35 oppose each other. Two ball housing sections 38 and 38 that are connected by a slit 37 are formed in the long pocket 30. An outer surface of the projections 36 and 36 is a continuous spherical surface having a same curvature radius as the outer spherical surface 28a of the cage 28. An inner surface of the projections 36 and 36 is a continuous surface having a same curvature radius as the inner spherical surface 28b of the cage 28. According to the embodiment, the shape of the projection 36 is a trapezoid (a so-called Mount Fuji shape) of which a side of the projection 36, viewed from a cage outer circumference side, is a circular-arc surface. Therefore, a projection end surface 36a of each projection 36 is a planar surface extending along a cage circumferential direction. The projection end surfaces 36a face (oppose) each other with a predetermined amount of space M therebetween.

Figure 8:
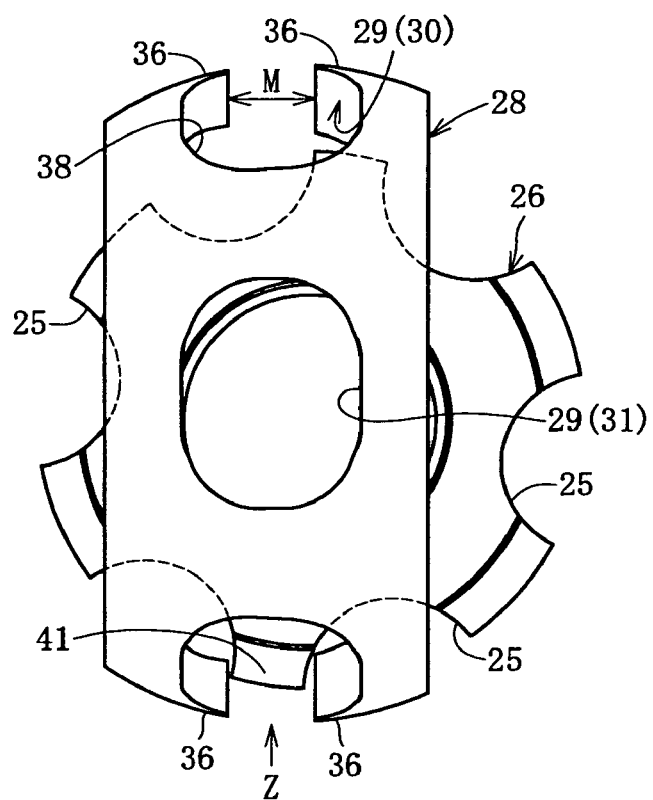
FIG. 8 is a side view of a relationship between the inner ring and the cage in the fixed constant velocity universal joint.
Figure 9:
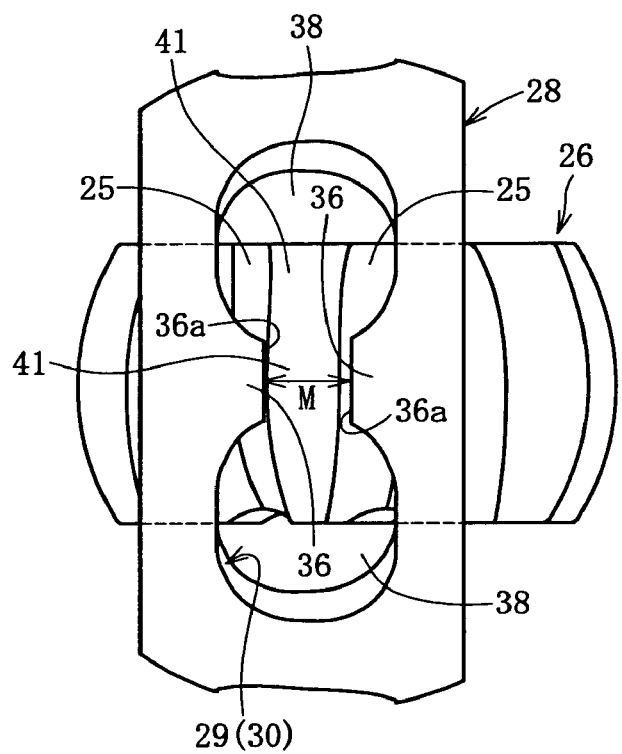
FIG. 9 is a diagram of a view from an arrow Z direction in FIG. 8.

As shown in FIG. 8 and FIG. 9, the predetermined amount of space M is a length that does not affect a shoulder section (a projecting section between adjacent track grooves) of the inner ring 26 during assembly. The size and shape of the projections 36 are also required to be set so as not to interfere with movement of the balls 27 housed in the ball housing sections 38 during rotation at an operating angle and the like. The projections 36 can be formed by mechanical processing and plastic working when the long pockets 30 are being formed.

In the fixed constant velocity universal joint of the present invention, a number of window columns 33 between the pockets in the cage 28 can be four. A circumferential direction length of a single window column 33 can be long. Therefore, rigidity of each cage window column 33 can be increased. As a result, the large balls 27 can be disposed in a small PCD. Size reduction can be achieved for a fixed constant velocity universal joint that can be made compact without reducing load capacity. Moreover, damage to the cage 28 in relation to torsional torque at a high angle can be prevented.

When the projections 36 are not provided in the long pocket 30, the window column between the balls 27 and 27 housed within the long pocket 30 is not present. A region over which the cage outer spherical surface that is in contact with the inner spherical surface of the inner ring 23 is discontinuous increases, thereby causing a following issue.

When the rotation is performed at an operating angle and torque is applied, the cage 28 may become deformed. When the cage 28 becomes deformed, a window edge interferes with the outer ring inner spherical surface, causing workability to deteriorate and the window edge to chip. This issue is particularly prominent on a straight edge of the long pocket 30 and an outer ring inner spherical surface end section on the joint opening side.

Figure 17:
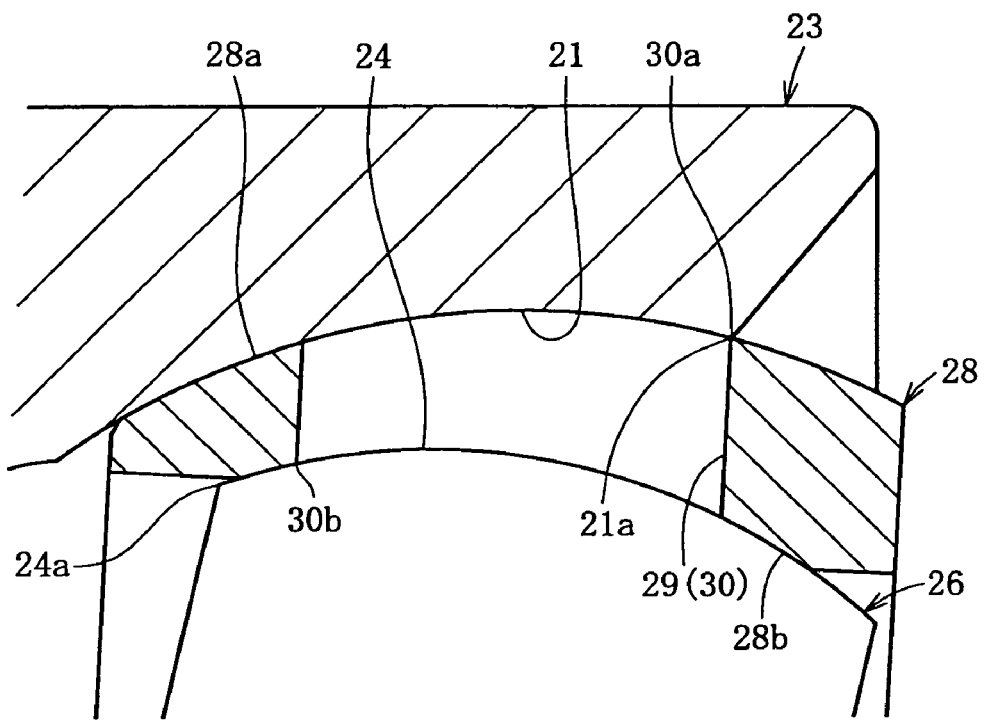
FIG. 17 is a cross-sectional enlarged view of main sections of a constant velocity universal joint using a cage in which the projection is not provided in the long pockets.
Figure 18:
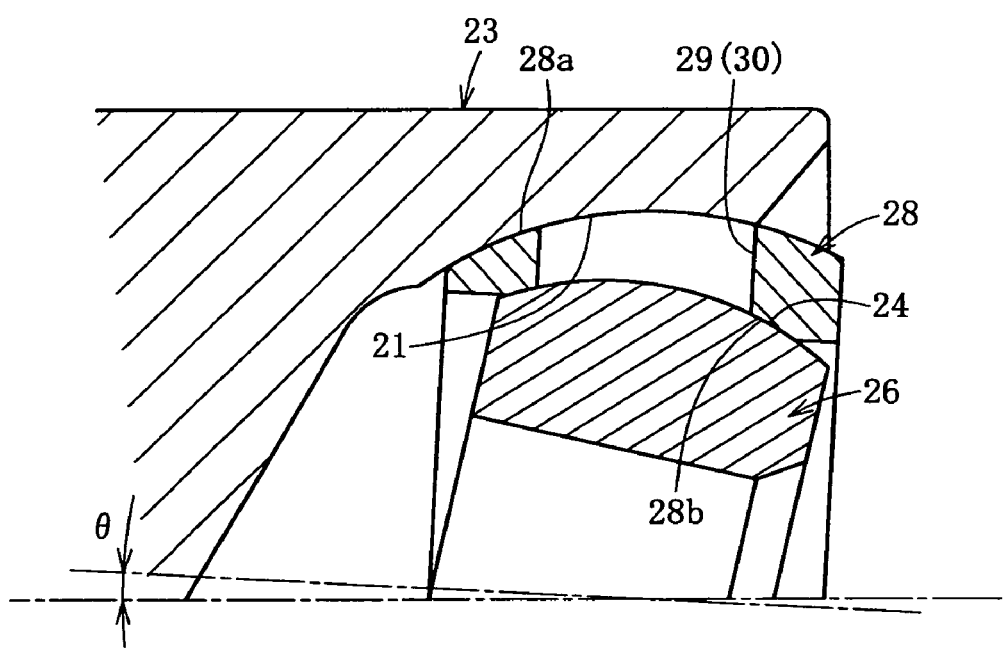
FIG. 18 is a cross-sectional view of main sections of the constant velocity universal joint using the cage in which the projection is not provided in the long pockets.
Figure 19:
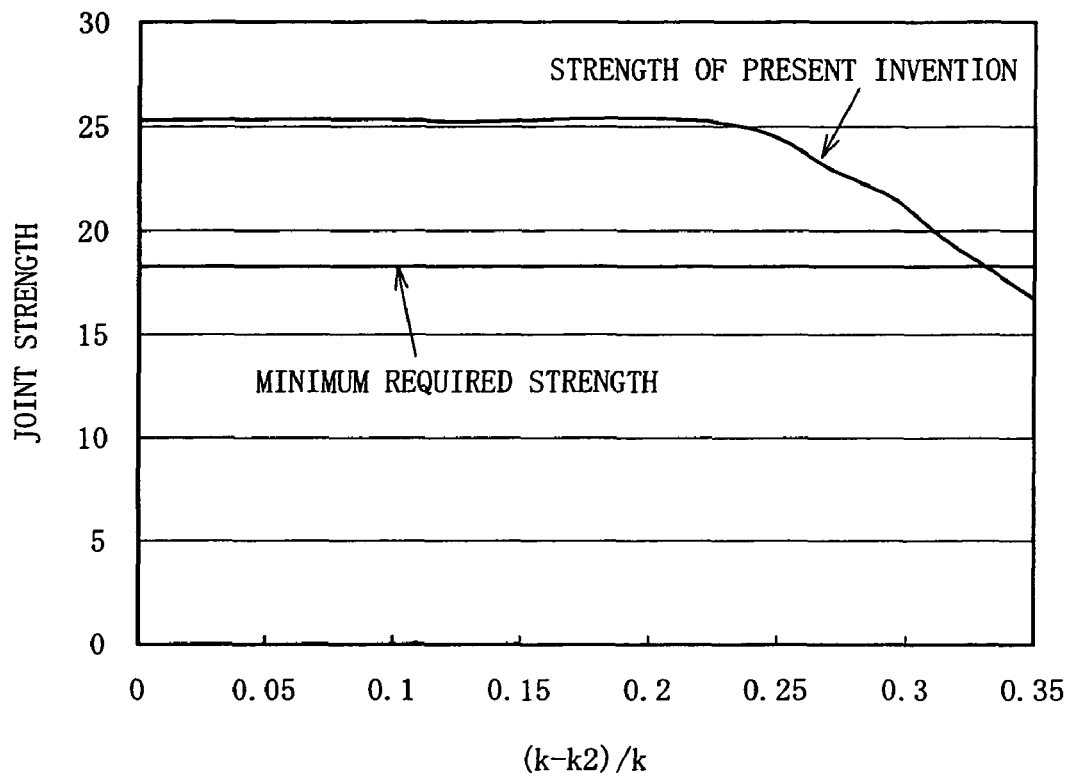
FIG. 19 is a diagram of a relationship between an offset amount k and a misalignment amount (k-k2)

As shown in FIG. 18, when the constant velocity universal joint is at an operating angle, as shown in FIG. 17, an inner circumferential edge 21a at the opening (entrance) of the outer ring 23 and a pocket edge 30a on the cage outer spherical surface 28a side interfere with each another at an early stage. An inner edge 24a of the outer spherical surface 24 of the inner ring 26 and a pocket edge 30b on the cage inner spherical surface 28b side also interfere with each other at an early stage. Therefore, workability deteriorates, and chipping and cracking of the window edge occur, thereby leading to damage to the joint at an early stage.

Moreover, when the projections 36 are not provided in the long pocket 30, contact area between components (contact area between the cage outer spherical surface 28a and the inner spherical surface 21 of the outer ring 23, and contact area between the cage inner spherical surface 28b and the outer spherical surface 24 of the inner ring 26) becomes small. Therefore, surface pressure increases, and an amount of generated heat increases, thereby leading to damage to the joint at an early stage.

Therefore, in the present invention, as a result of the projections 36 being provided, rigidity of frames (window frames) used to form the pockets 29 can be improved. As a result, deformation of the cage 28 caused by insufficient rigidity of the window frames can be prevented. Workability of the joint does not deteriorate. Stable workability can be achieved for a long period of time. Furthermore, as a result of the projections 36 being provided, the contact area between the outer ring 23 and the inner ring 26 can be increased Heat generation during sliding can be suppressed, and damage to the joint at an early stage can be prevented.

Figure 10:
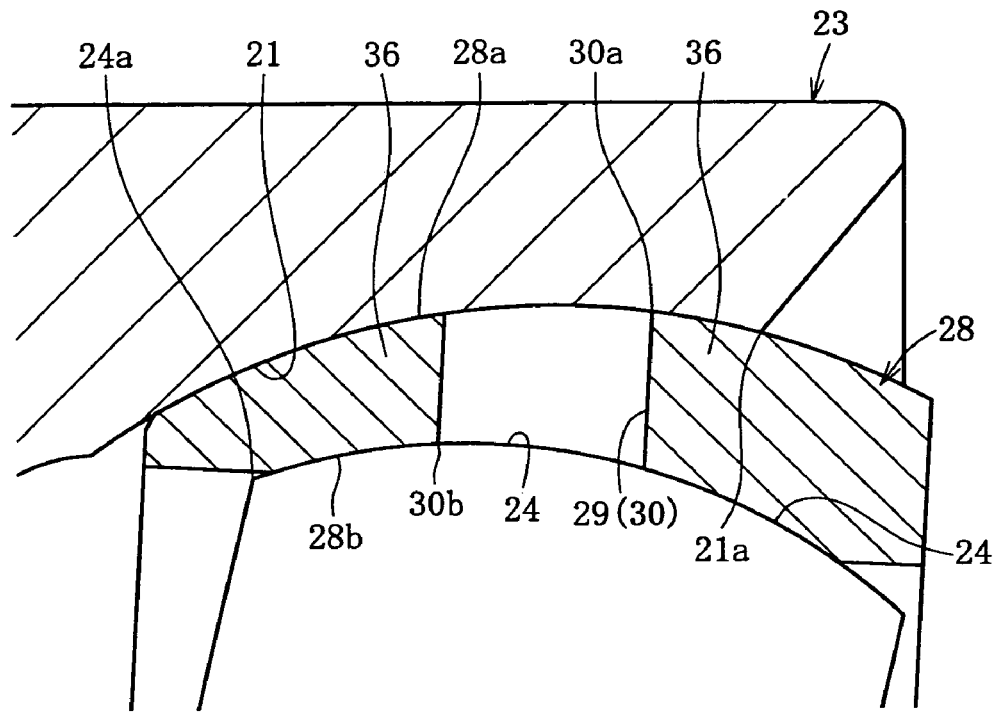
FIG. 10 is a cross-sectional enlarged view of main sections of the fixed constant velocity universal joint.
Figure 11:
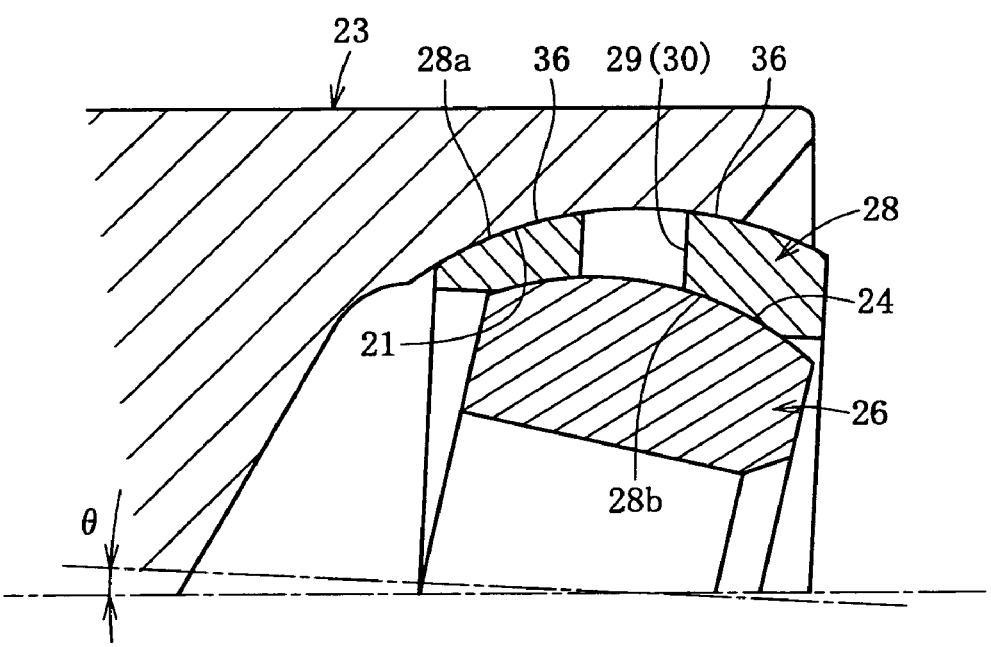
FIG. 11 is a cross-sectional enlarged view of main sections when the fixed constant velocity universal joint is at an operating angle.
Figure 12:
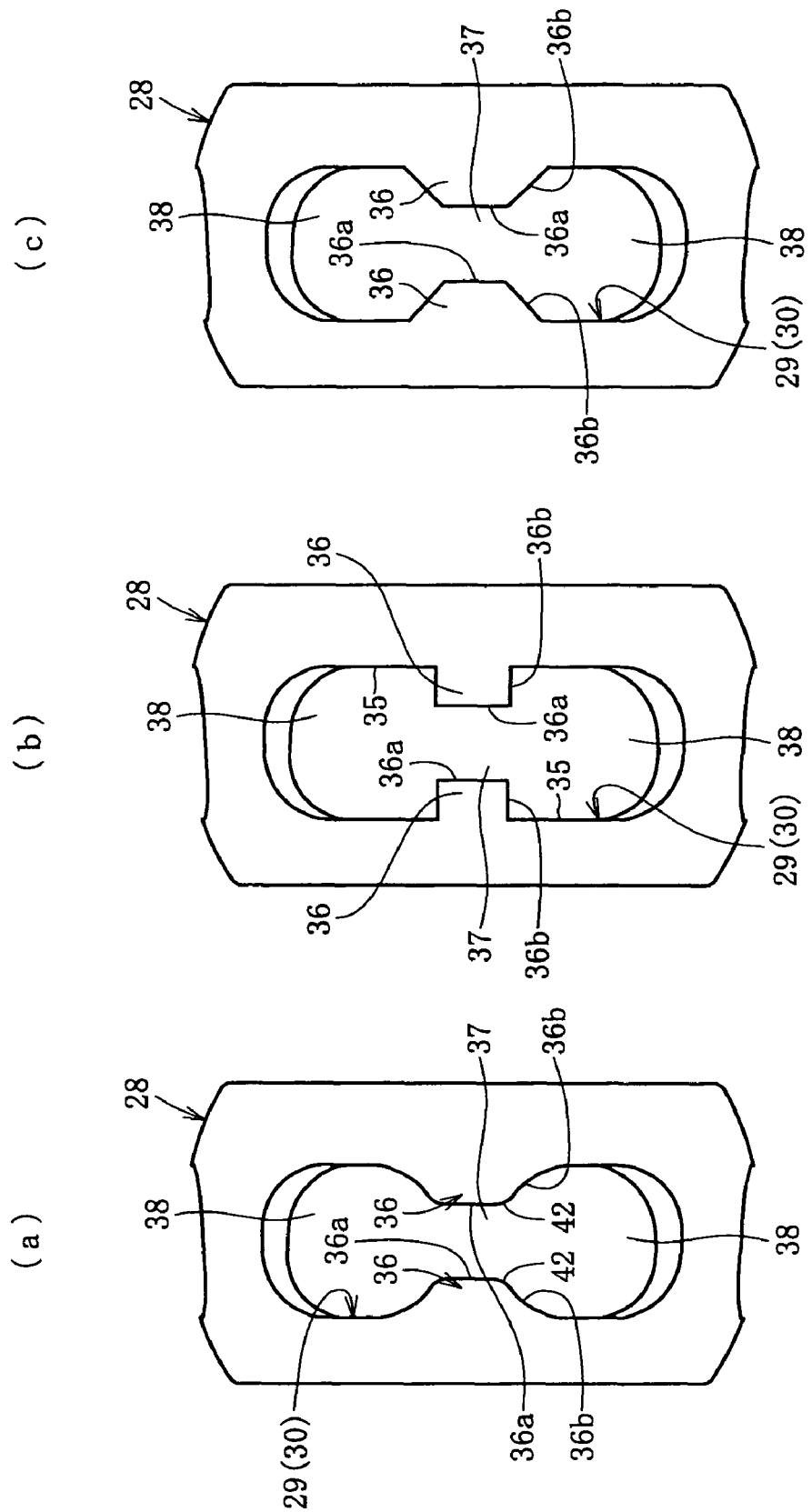
FIG. 12A to FIG. 12C are diagrams of modified examples of the cage in the fixed constant velocity universal joint.

When the projection 36 is provided on the long side 35 on the joint opening side, as shown in FIG. 10 and FIG. 11, when the fixed constant velocity joint is at an operating angle θ, the interference between the inner circumferential edge 21a at the opening (entrance) of the outer ring 23 and the pocket edge 30a on the cage outer spherical surface 28a side can be delayed or prevented. When the projection 36 is provided on the long side 35 on the joint inner side, the interference between the inner edge 24a of the outer spherical surface 24 of the inner ring 26 and the pocket edge 34b on the cage inner spherical surface 28b side can be delayed or prevented. Therefore, guidance of the cage 28 to the inner spherical surface 21 of the outer ring 23 and the outer spherical surface 24 of the inner ring 26 can be facilitated. Deterioration in the workability of the joint can be prevented. In accompaniment with the prevention of deterioration in the workability of the joint as a result of improved rigidity of the window frames, chipping and cracking of the cage 28 can be effectively prevented.

As a result of the long pockets 30 being provided, mounting of the inner ring 26 to the cage 28 can be facilitated. In particular, as a result of the axial direction length i of the inner ring 26 being shorter than the circumferential direction spacing h of the long pockets 30, the mounting of the inner ring 26 to the cage 28 can be further facilitated, thereby improving mounting operability.

In other words, when the inner ring 26 is mounted to the cage 28, in a state in which the inner ring 26 is disposed such that an axial line of the inner ring 26 is perpendicular to an axial line of the cage 28 (a state in which the inner ring 26 is rotated 90° to the cage 28), a portion of the outer spherical surface 24 of the inner ring 26 is dropped into a pocket 29 of the cage 28. In this state, the inner ring 26 is inserted into the cage 28. The inner ring 28 is then rotated 90° to the cage 28. The axial line of the inner ring 26 is aligned with the axial line of the cage 28, and the inner ring 26 is disposed in a normal position. Therefore, when the inner ring 26 is mounted to the cage 28, a portion of the outer spherical surface 24 of the inner ring 26 can be dropped into the long pocket 30, and mounting of the inner ring 26 to the cage 28 can be facilitated.

In addition, an inter-pitch distance of the two balls 27 housed in the long pocket 30 can be shortened, and an inter-pitch distance of the corresponding track grooves 22 on the outer ring 23 can be shortened. As a result, mounting of the cage 28 to the outer ring 23 can be facilitated. In particular, the inter-pitch distance (shoulder width dimension f between track grooves) can be made smaller than the pocket width g in the cage axial direction. As a result, the mounting of the cage 28 to the outer ring 23 can be further facilitated, and mounting operability can be improved.

The offset amount of the cage 28 is made large to become almost the same as the offset amounts of the track grooves 22 and 25. Therefore, the track groove depth on the joint inner side can be prevented from becoming shallow, and the thickness of the cage 28 on the opening side (radial direction thickness) can be increased. As a result, the balls can be prevented from running over a track edge at a high angle, and excessive stress is not placed on the edge. In other words, decrease in torsional torque load capacity at a high angle can be prevented. An improvement in high angle durability life and an improvement (modification) in damage strength caused by plastic deformation of the track grooves in the inner ring and the outer ring at a high angle can be achieved.

The thickness (radial direction thickness) of the cage 28 on the joint opening side can be increased. Therefore, rigidity of a cage window frame on the joint opening side can be increased. As a result, in accompaniment with the increase in the rigidity of each cage window column, significant improvement in cage damage strength in relation to torsional torque at a high angle can be achieved.

When two balls 27 are housed in the long pocket 30, the window column 33 is not present between the balls. Therefore, the rigidity of the window frame on the joint opening side receiving a large load from the balls 27 is required to be increased. However, as described above, because the offset amount of the cage 28 is increased to be almost the same as the offset amounts of the track grooves 22 and 25, the rigidity of the window frame on the joint opening side can be increased. Strength of the cage 28 can be sufficiently maintained, even in a configuration in which two balls 27 are housed in the long pocket 30.

Next modified examples of the projection 36 are shown in FIG. 12A to FIG. 12C. In FIG. 12A, a corner section 42 between the projection end surface 36a and a side surface 36b of the projection 36 is arc-shaped. In FIG. 12B, side surfaces 36b are planar surfaces parallel in the cage axial direction and forming right angles with the long side 35. In FIG. 12C, the side surfaces 36b are angled surfaces. Effects similar to those achieved by the projections 36 shown in FIG. 3 and FIG. 4 can also be achieved by the projections 36 shown in FIG. 12A to FIG. 12C.

Figure 13:
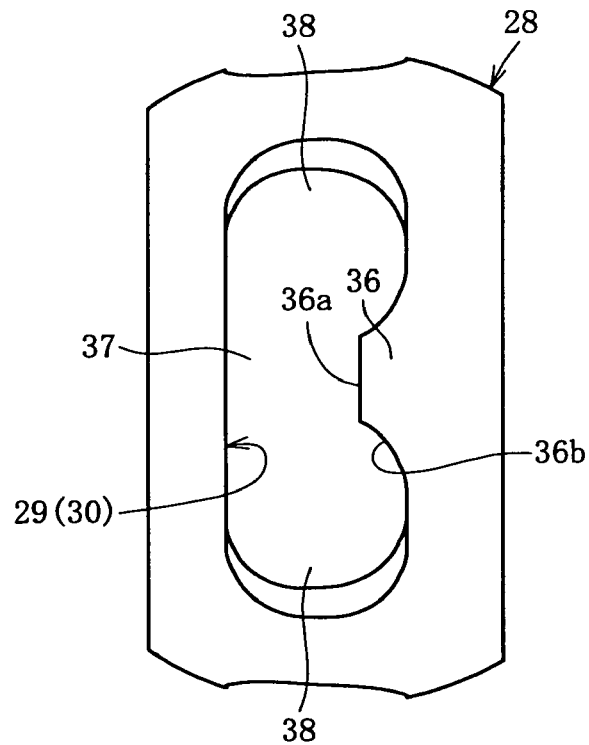
FIG. 13 is a side view of a fourth modified example of the cage in the fixed constant velocity universal joint.
Figure 14:
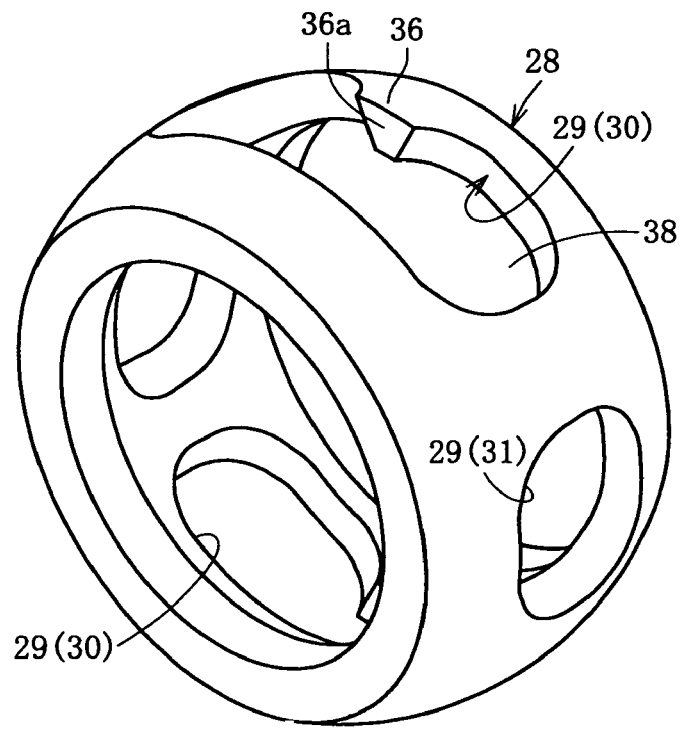
FIG. 14 is a perspective view of the cage in FIG. 13.
Figure 15:
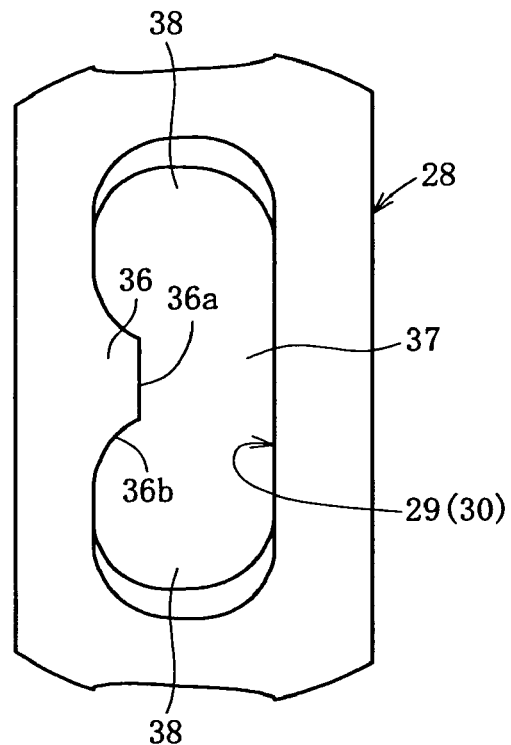
FIG. 15 is a side view of a fifth modified example of the cage in the fixed constant velocity universal joint.
Figure 16:
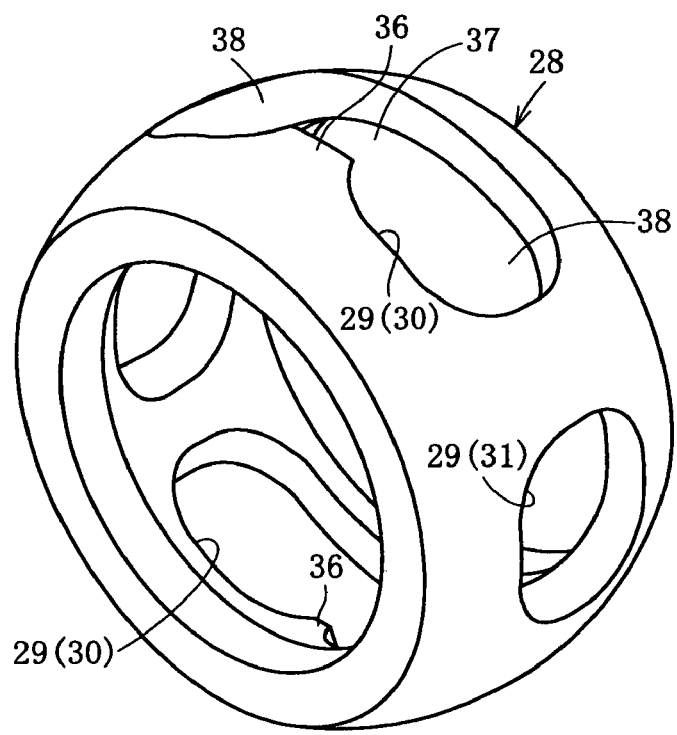
FIG. 16 is a perspective view of the cage in FIG. 15.

In FIG. 13 and FIG. 14, the projection 36 is provided only on the long side 35 on the opening side. In FIG. 15 and FIG. 16, the projection 36 is provided only on the long side 35 on the inner side. When the projection 36 is provided only on the long side 35 on the opening side, the interference between the inner circumferential edge 21a at the opening (entrance) of the outer ring 23 and the pocket edge 30a on the cage outer spherical surface 28a side can be delayed or prevented. When the projection 36 is provided on the long side 35 on the joint inner side, the interference between the inner edge 24a of the outer spherical surface 24 of the inner ring 26 and the pocket edge 34b on the cage inner spherical surface 28b side can be delayed or prevented.

The above-described fixed constant velocity universal joint is an undercut-free type (J) including the straight grooves 22b and 25b in the track grooves 22 and 25. However, the fixed constant velocity universal joint can also be a Birfield type (BJ) that does not have straight grooves such as these. The track groove bottoms in the inner ring 26 and the outer ring 23 can also have an arc section and a tapered section. In this case, the tapered section of the track groove 22 on the outer ring 23 is preferably provided on the opening side and expands from the inner side towards the opening side. This is to allow a large operating angle.

Figure 41:
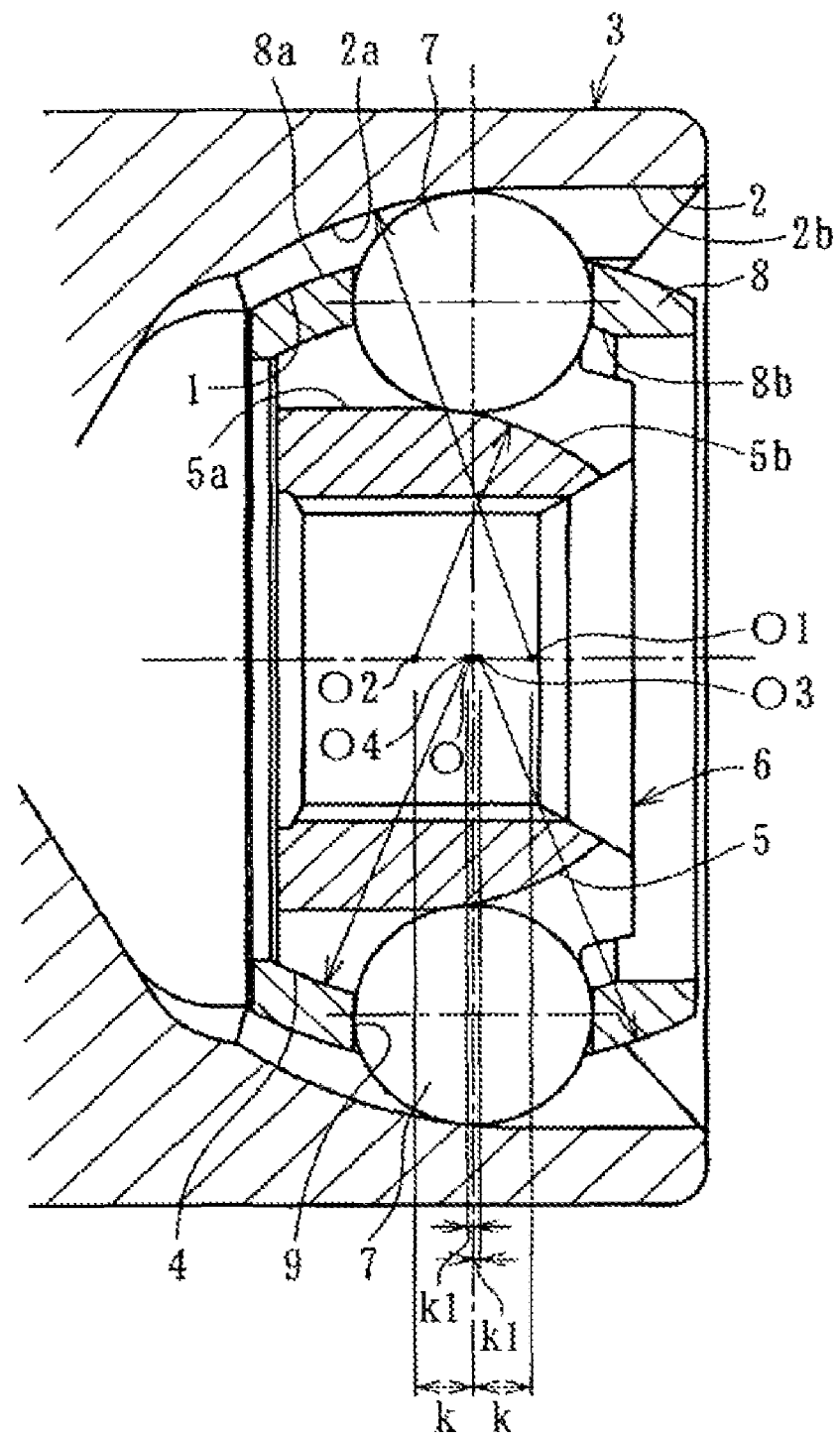
FIG. 41 is a vertical cross-sectional view of a conventional constant velocity universal joint.
Figure 42:
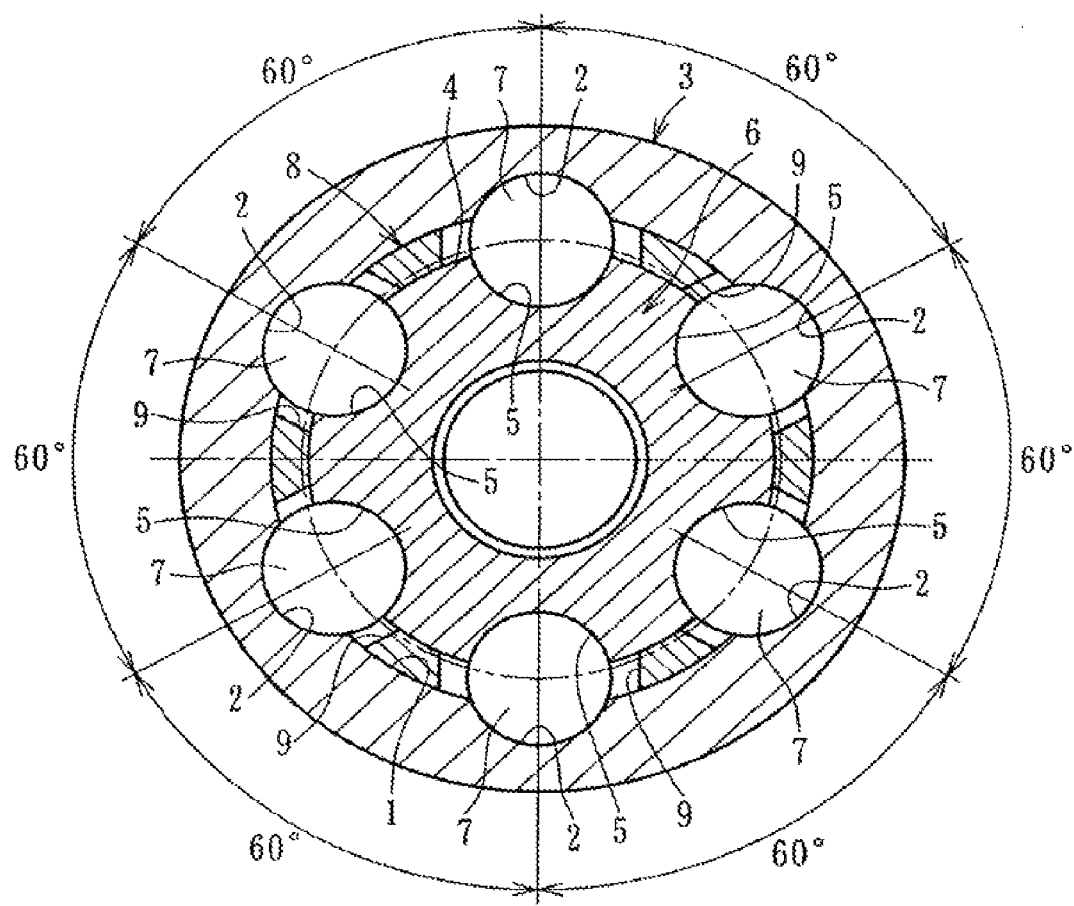
FIG. 42 is a horizontal cross-sectional view of the conventional constant velocity universal joint.

The basic embodiment of the present invention has been described above. However, the present invention is not limited to the embodiment. Various modifications can be made. For example, according to the above-described embodiment, the center of curvature O1 and the center of curvature O3 are disposed in slightly misaligned positions. The center of curvature O2 and the center of curvature O4 are disposed in slightly misaligned positions. However, the center of curvature O1 and the center of curvature O3 can be disposed in the same position. The center of curvature O2 and the center of curvature O4 can be disposed in the same position. In addition, when the center of curvature O1 and the center of curvature O3 are misaligned, or when the center of curvature O2 and the center of curvature O4 are misaligned, a misalignment amount can be arbitrarily set However, a proportion of the offset amount and the misalignment amount (k-k2) is preferably set to be (k-k2)/k≦0.3. When (k-k2)/k>0.3, there is no difference from the conventional fixed constant velocity universal joint shown in FIG. 41. The track groove depth on the joint inner side becomes shallow, and the thickness of the cage 28 on the opening side cannot be increased. Strength of the joint becomes less than a required strength (see FIG. 19).

Moreover, the circumferential direction spacing h of the long pockets 30 can be variably set within a range in which improvement in the mountability of the cage 28 to the inner ring 26 can be achieved and the rigidity of the window columns 33 does not decrease. Furthermore, the shoulder width dimension f between track grooves, the pocket width g in the cage axial direction of the cage 28, and the like can be set taking into consideration mountability of the cage 28 to the outer ring 23. The projection end surface 36a of the projection 36 can be a curved surface rather than a planar surface.

Figure 20:
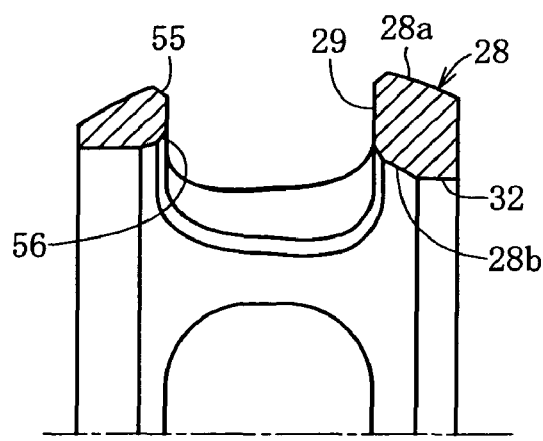
FIG. 20 is a cross-sectional view of a cage in a fixed constant velocity universal joint.
Figure 21:
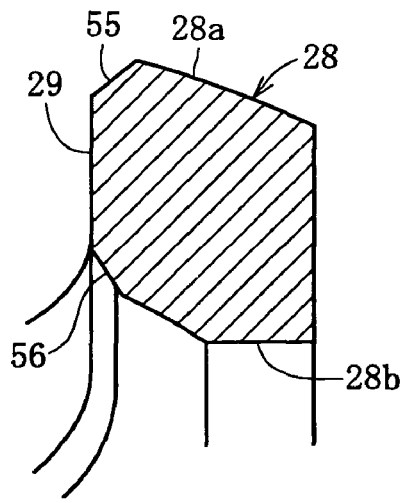
FIG. 21 is a cross-sectional view of main sections of the cage in the fixed constant velocity universal joint.
Figure 27:
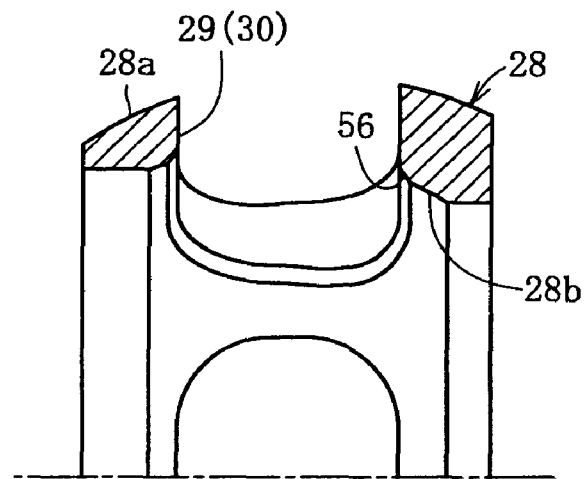
FIG. 27 is a cross-sectional view of a second modified example of the cage in the fixed constant velocity universal joint.
Figure 28:
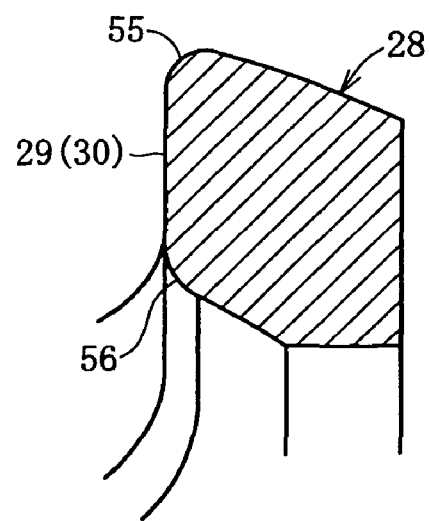
FIG. 28 is a cross-sectional view of a modified example of the chamfer section of the cage.

Next, a modified embodiment of the present invention will be described with reference to FIG. 20 to FIG. 30. As shown in FIG. 20, according to the modified embodiment, chamfer sections (chamfered sections) 55 and 56 are formed along an overall periphery of the edges of the long pockets 30 on the outer spherical surface 28a side and the inner spherical surface 28b side. As shown in FIG. 21, according to the modified embodiment, the chamfer sections 55 and 56 are tapered surfaces. However, as shown in FIG. 28, the chamfer sections 55 and 56 can be formed into arc sections.

When the chamfer sections 55 and 56 are not provided, when the constant velocity universal joint is at an operating angle, the inner circumferential edge 21a at the opening (entrance) of the outer ring and the pocket edge on the cage outer spherical surface side interfere with each another. The inner edge 24a of the outer spherical surface 24 of the inner ring 26 and the pocket edge 30b on the cage inner spherical surface 28b side also interfere with each other. Therefore, workability deteriorates, and chipping and cracking of the window edge occur, thereby leading to damage to the joint at an early stage.

Figure 22:
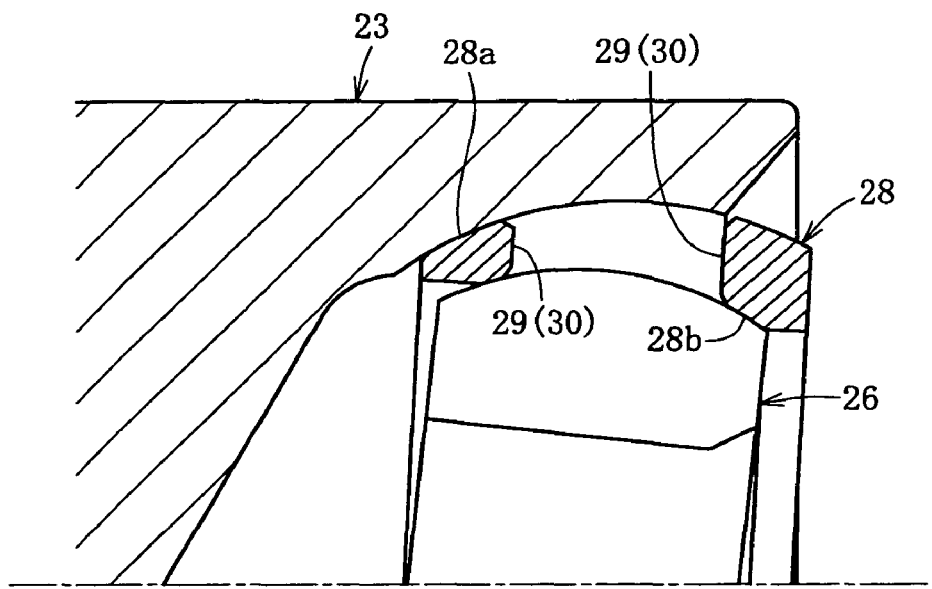
FIG. 22 is a cross-sectional view of a relationship between an inner circumferential edge of an outer ring and a chamfer section of the cage in the fixed constant velocity universal joint.
Figure 23:
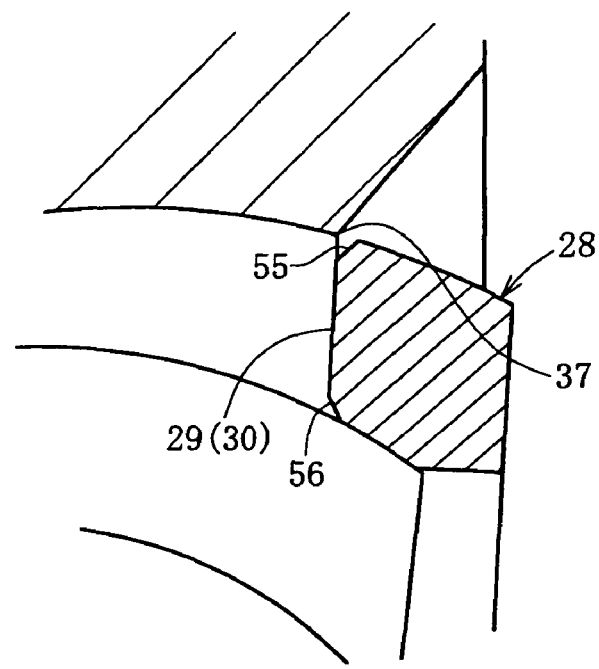
FIG. 23 is a cross-sectional enlarged view of main sections in FIG. 22.

Therefore, in the present invention, as a result of the chamfer section 55 being provided on the edge of the long pocket 30 on the cage outer spherical surface 28a side on the joint opening side, when the fixed constant velocity universal joint is at an operating angle such as that shown in FIG. 22, as shown in FIG. 23, the pocket edge on the cage outer spherical side does not interfere with the inner circumferential edge 21a at the opening (entrance) of the outer ring 23.

Figure 24:
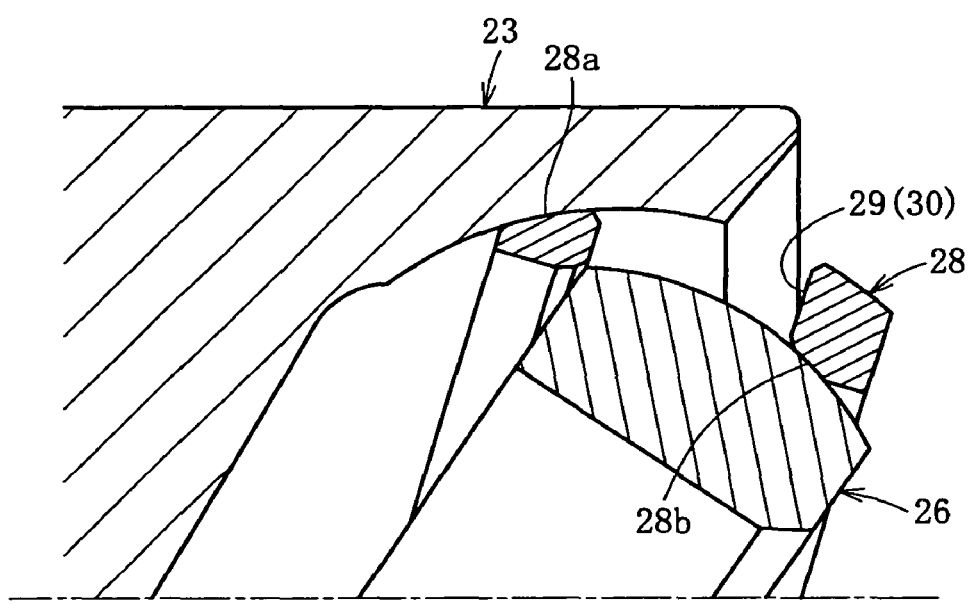
FIG. 24 is a cross-sectional view of a relationship between an inner edge of an inner ring and the chamfer section of the cage in the fixed constant velocity universal joint.
Figure 25:
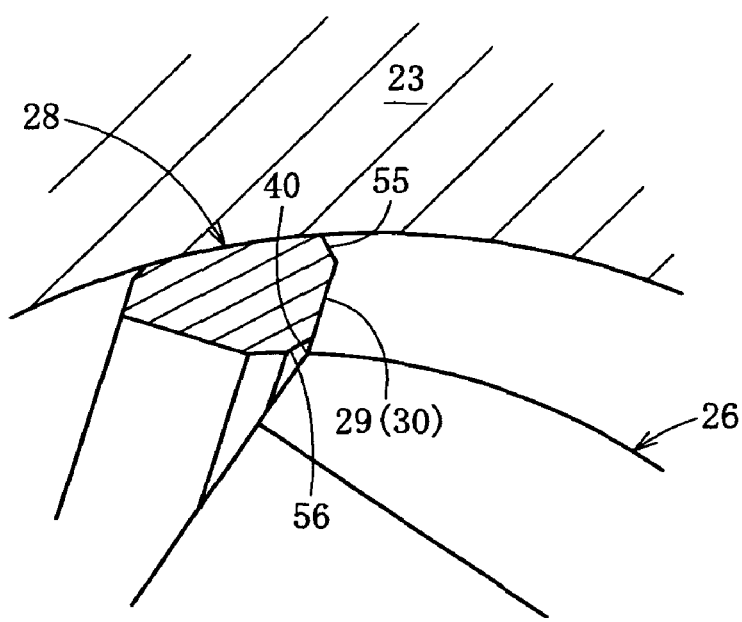
FIG. 25 is a cross-sectional enlarged view of main sections in FIG. 24.

As a result of the chamfer section provided in the long pocket 30 being provided on the edge of the long pocket on the cage inner spherical surface side on the joint inner side, when the fixed constant velocity universal joint is at an operating angle such as those shown in FIG. 24 and FIG. 25, the pocket edge on the cage inner spherical surface side does not interfere with an inner edge 40 (24a) of the outer spherical surface 24 of the inner ring 26.

Figure 26:
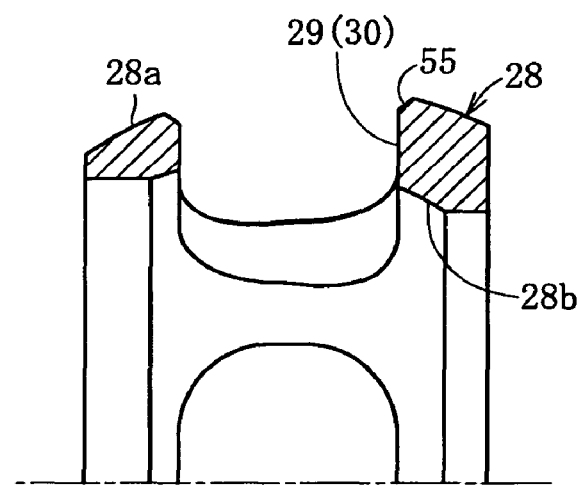
FIG. 26 is a cross-sectional view of a first modified example of the cage in the fixed constant velocity universal joint.

FIG. 26 shows when the chamfer section 56 is not provided on the cage inner spherical surface 28b side. FIG. 27 shows when the chamfer section 55 is not provided on the cage outer spherical surface 28a side. In other words, in FIG. 26, the interference between the inner circumferential edge 21a at the opening (entrance) of the outer ring 23 and the pocket edge on the cage outer spherical surface side can be prevented. In FIG. 27, the interference between the inner edge 40 of the outer spherical surface 24 of the inner ring 26 and the pocket edge on the cage inner spherical surface side can be avoided. The chamfer section 55 can also be provided only on the long side section of the long pocket 30.

Next, another modified embodiment will be described with reference to FIGS. 29 and 30. According to the modified embodiment, notched sections 50a and 50b that are not in contact with the inner spherical surface 21 of the outer ring 23 are provided on the cage outer spherical surface 28a. Each notched section 50a and 50b are formed on the cage surface including the projection 36. The notched sections 50a and 50b are fan-shaped or Gingko-leaf shaped when viewed from the outer direction. The notched section 50a of a long side section 41a on one side (joint opening side) is formed larger than the notched section 50b on a long side section 41b on the other side (joint inner side). The notched section can also be formed only on the long side section 41a on the joint opening side.

In this way, in the constant velocity universal joint using a cage 28 in which the notched sections 50a and 50b are formed, when the fixed constant velocity universal joint is at an operating angle, interference of an inner circumferential edge 37 at the opening (entrance) of the outer ring 23 can be avoided.

Figure 29:
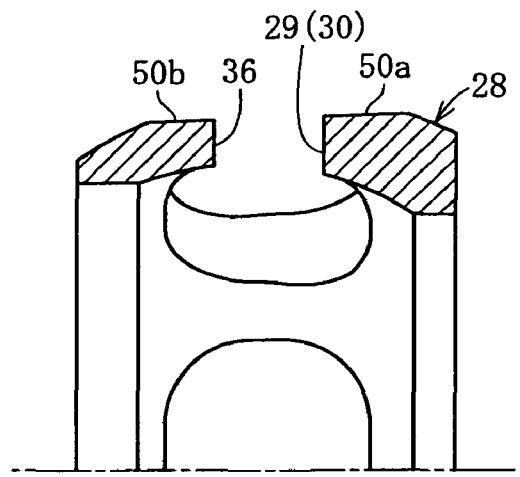
FIG. 29 is a cross-sectional view of a fixed constant velocity universal joint according to an embodiment of the present invention.
Figure 30:
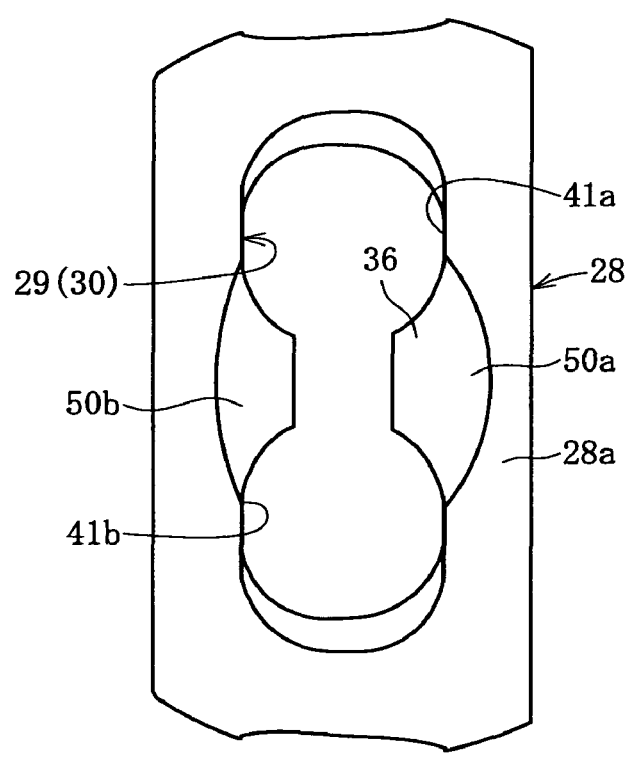
FIG. 30 is a side view of a cage in FIG. 29.

In other words, even in the cages 28 shown in FIG. 29 and FIG. 30, chipping and cracking of the cage 28 can be effectively prevented.

Next, still another modified embodiment of the present invention will be described with reference to FIG. 31 to FIG. 40.

Figure 31:
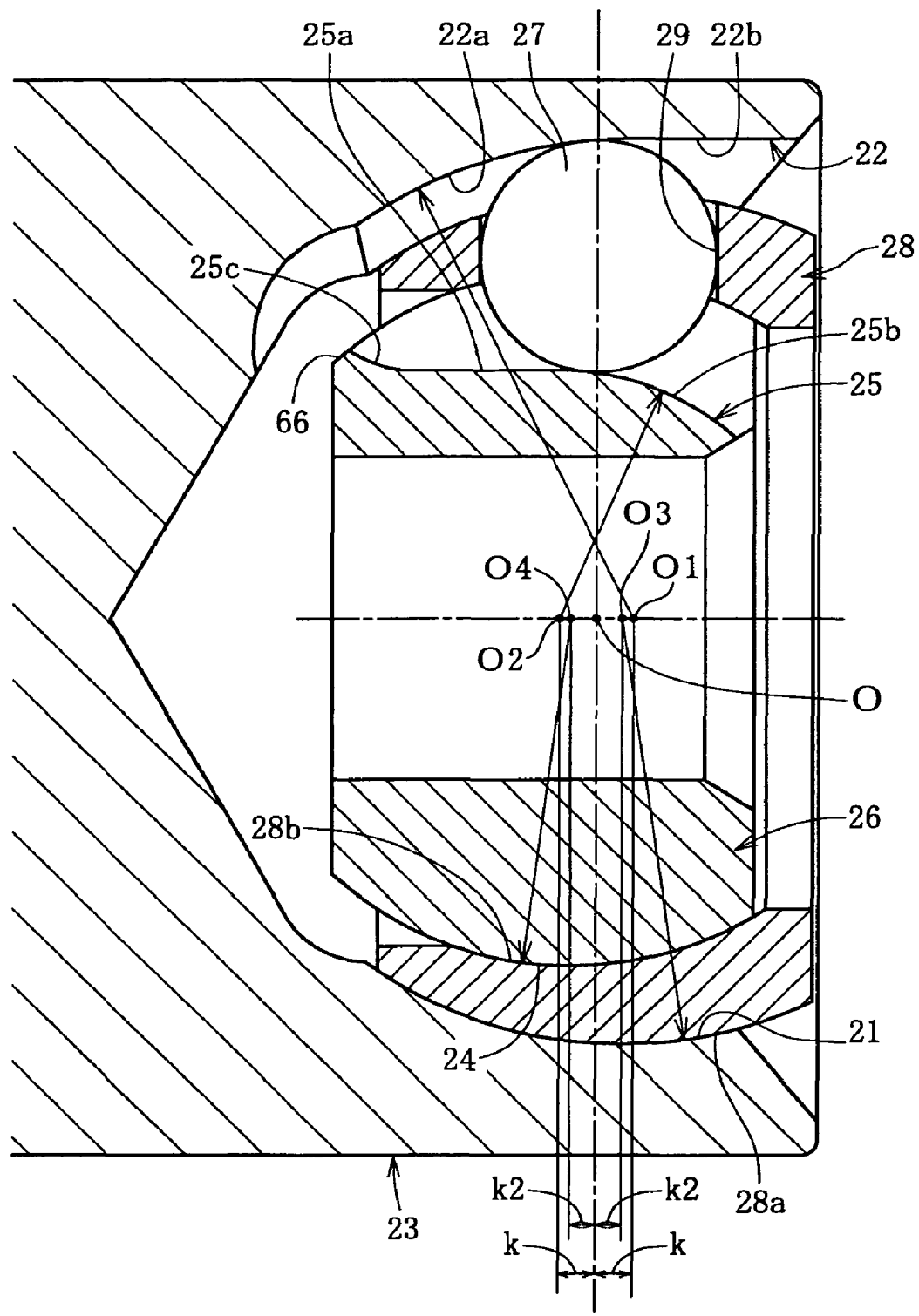
FIG. 31 is a cross-sectional view of a fixed constant velocity universal joint according to an embodiment of the present invention.

As shown in FIG. 31, the fixed constant velocity universal joint according to the modified embodiment includes the outer ring 23, the inner ring 26, the plurality of balls 27, and the cage 28. The outer ring 23 serves as the outer member in which the plurality of track grooves 22 are formed on the inner spherical surface 21 along the axial direction, unevenly spaced in the circumferential direction. The inner ring 26 serves as the inner member in which the plurality of track grooves 25 paired with the track grooves 22 on the outer ring 23 are formed on the outer spherical surface 24 along the axial direction, unevenly spaced in the circumferential direction. The balls 27 are interposed between the track grooves 22 of the outer ring 23 and the track grooves 25 of the inner ring 26 and transmit torque. The cage 28 is interposed between the inner spherical surface 21 of the outer ring 23 and the outer spherical surface 24 of the inner ring 26 and holds the balls 27.

The track groove 22 on the outer ring 23 is composed of the inner side track groove 22a and the opening side track groove 22b. The inner side track groove 22a has a track groove bottom that is an arc section. The opening side track groove 22b has a track groove bottom that is a straight section parallel with the outer ring axial line. The center of curvature O1 of the inner side track groove 22a is shifted in the axial direction, from the joint center O towards the opening side of the outer ring 23.

Figure 34:
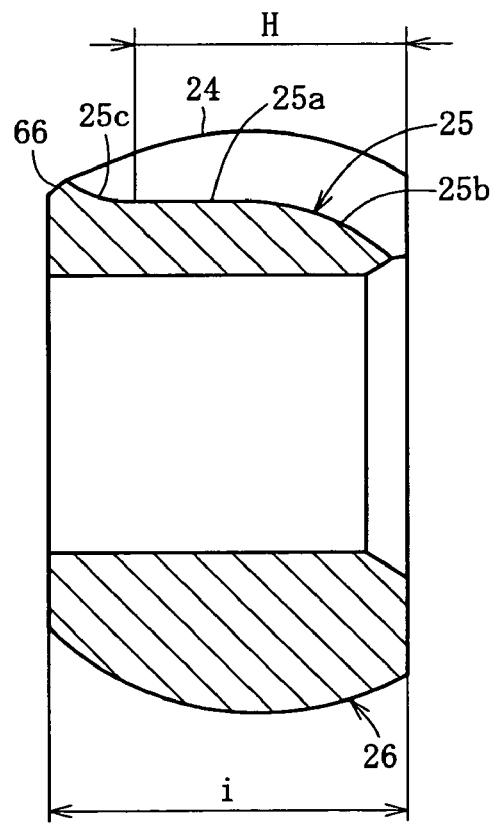
FIG. 34 is a cross-sectional view taken along line B-O-B' in FIG. 33.
Figure 35:
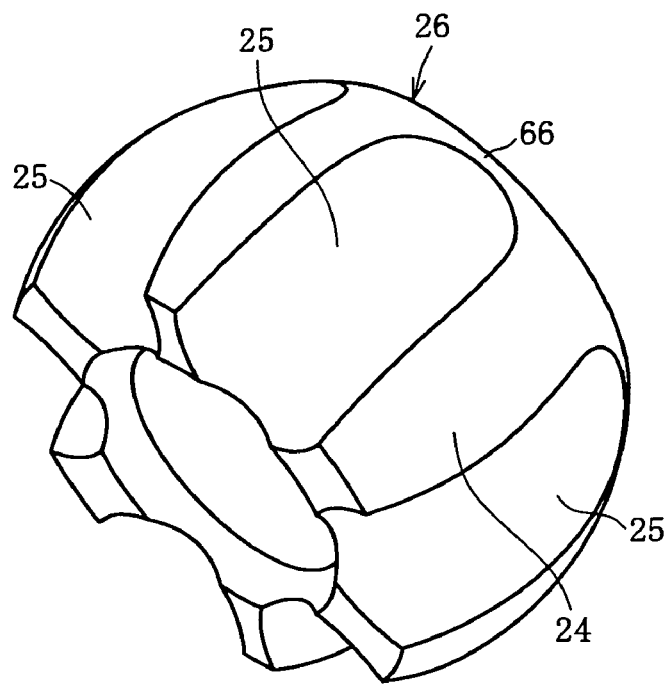
FIG. 35 is a perspective view of the inner ring in the fixed constant velocity universal joint.

The track groove 25 on the inner ring 26 is composed of the inner side track groove 25a and the opening side track groove 25b. The inner side track groove 25a has a track groove bottom that is a straight section parallel to the inner ring axial line. The opening side track groove 25b has a track groove bottom that is an arc section. In this case, as shown in FIG. 34, a region H formed by the inner side track groove 25a and the opening side track groove 25b is a track-required region over which the balls 27 roll. The center of curvature O2 of the opening track groove 25b is provided separated from the joint center O in the axial direction by an equal distance k in an inward direction on the side opposite of the center of curvature O1 of the inner side track groove 22a of the outer ring 23.

An inner groove section 25c that opens to the outer spherical surface 24 is provided connected to the inner side track groove 25a. Therefore, an arc section 66 that is continuous in the circumferential direction is formed on the end section on the joint inner side of the outer spherical surface 24 of the inner ring 26. In this case, the arc section 66 is formed along the overall periphery in the circumferential direction.

In the cage 28, the center of curvature O3 of the outer spherical surface 28a and the center of curvature O4 of the inner spherical surface 28b are offset in opposite axial directions from the joint center (cage center) O by an equal distance k2. An offset amount of the cage 28 is made large to be almost the same as an offset amount of the track grooves.

Therefore, the outer spherical surface 28a of the cage 28 can form an arc (concentric arc having a different curvature radius) that is almost concentric with the groove bottom of the inner side track groove 22a in the outer ring 23. Track groove depth on the joint inner side can be prevented from becoming shallow. In addition, the thickness of the cage 28 on the opening side (radial direction thickness) can be increased.

Pockets 29 for housing the balls 27 are provided in the cage 28. In this case, as in FIG. 2, four pockets 29 are provided in the cage 28, the pockets 29 being the pair of long pockets 30 of which circumferential direction spacing is wide and the pair of short pockets 31 of which circumferential direction spacing is narrow. The pair of long pockets 30 are shifted by 180 degrees along the circumferential direction, and the pair of short pockets 31 are shifted by 180 degrees along the circumferential direction. The long pockets 30 and the short pockets 31 are alternately disposed along the circumferential direction. Therefore, four window columns (cage window columns) 33 are provided between the pockets. The long pocket 30 stores two balls 27, and the short pocket 31 stores one ball 27.

The pitch angle e on PCD of the two balls 27 housed in the long pocket 30 is less than 60 degrees. In addition, the pitch angle d of other balls 27 is greater than 60 degrees. The axial direction length i (see FIG. 6) of the inner ring 26 is shorter than the circumferential direction spacing h (see FIG. 5) of the long pockets 30. Furthermore, as shown in FIG. 7, the shoulder width f between two track grooves in the outer ring 23 corresponding to the long pockets 30 in the cage 28 are set to be shorter than the pocket width g in the cage axial direction.

In the fixed constant velocity universal joint of the present invention, the number of window columns 33 between the pockets in the cage 28 can be four. The circumferential direction length of a single window column 33 can be long. Therefore, rigidity of each cage window column 33 can be increased. As a result, the large balls 27 can be disposed in a small PCD. Size reduction can be achieved for a fixed constant velocity universal joint that can be made compact without reducing load capacity. Moreover, damage to the cage 28 in relation to torsional torque at a high angle can be prevented.

Figure 38:
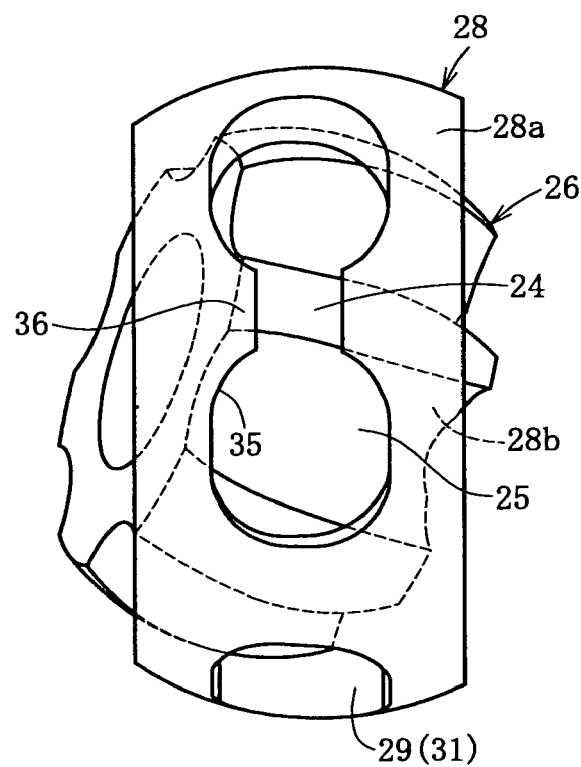
FIG. 38 is a perspective view of a relationship between the inner ring and the cage when a fixed constant velocity universal joint in which an arc section is not provided in the inner ring is at an operating angle.
Figure 39:
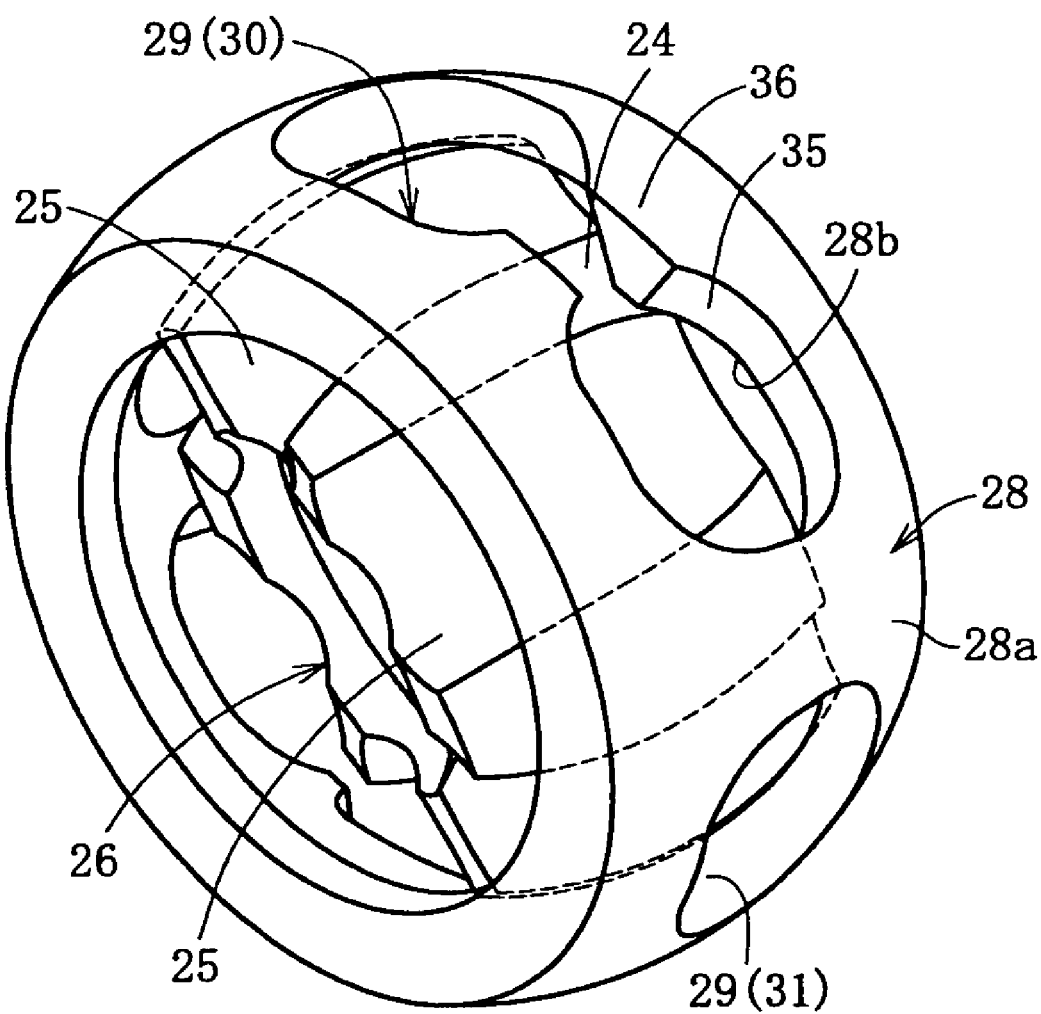
FIG. 39 is a perspective view of the relationship between the inner ring and the cage when the fixed constant velocity universal joint shown in FIG. 38 is at an operating angle, viewed from another direction.
Figure 40:
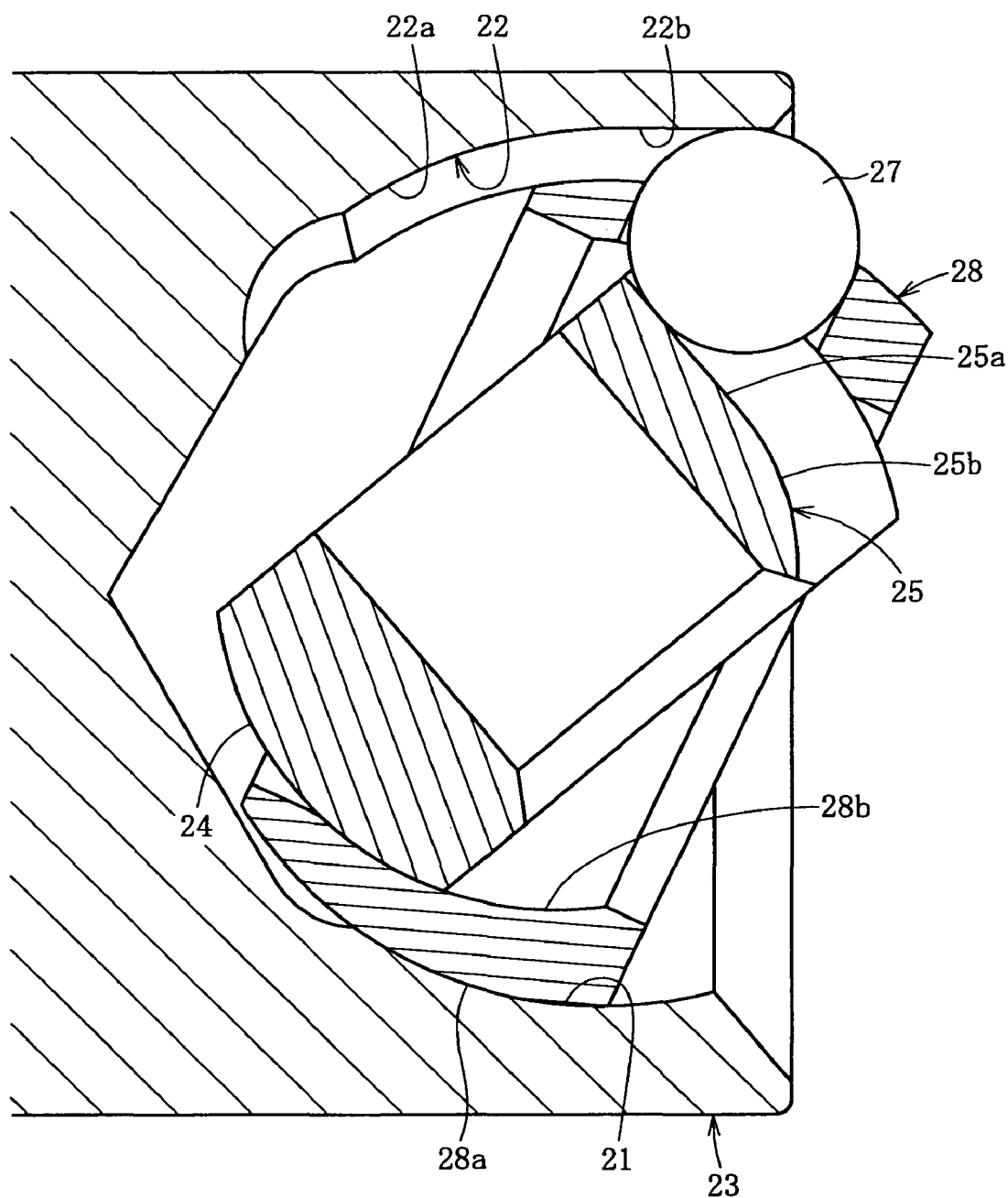
FIG. 40 is a cross-sectional view of when the fixed constant velocity universal joint shown in FIG. 38 is at an operating angle.

Because a window column is not provided between the two balls in the long pocket 30, unless the arc section 66 is provided in the inner ring 26, the outer spherical surface of the inner ring 26 is divided into six discontinuous sections by the six track grooves 25. As a result, the contact area between the inner ring 26 and the cage window frames (pocket frames) in the sections without the window columns decreases and the contact surface pressure increases. When the operating angle increases (a high angle), as shown in FIG. 38 to FIG. 40, a region in which the cage inner spherical surface 28b and the outer spherical surface 24 of the inner ring 26 do not come into contact is formed. In other words, contact between the inner ring 26 and the cage 28 becomes intermittent. Therefore, the cage 28 becomes more easily deformed due to load torque. When the cage 28 deforms, the end section of the inner ring 26 interferes with the edge of the long pocket 30 (the edge on the inner spherical surface 28b side of the long side 35). When interference such as this occurs, malfunction of the joint, and chipping and cracking of the edge occur.

Figure 32:
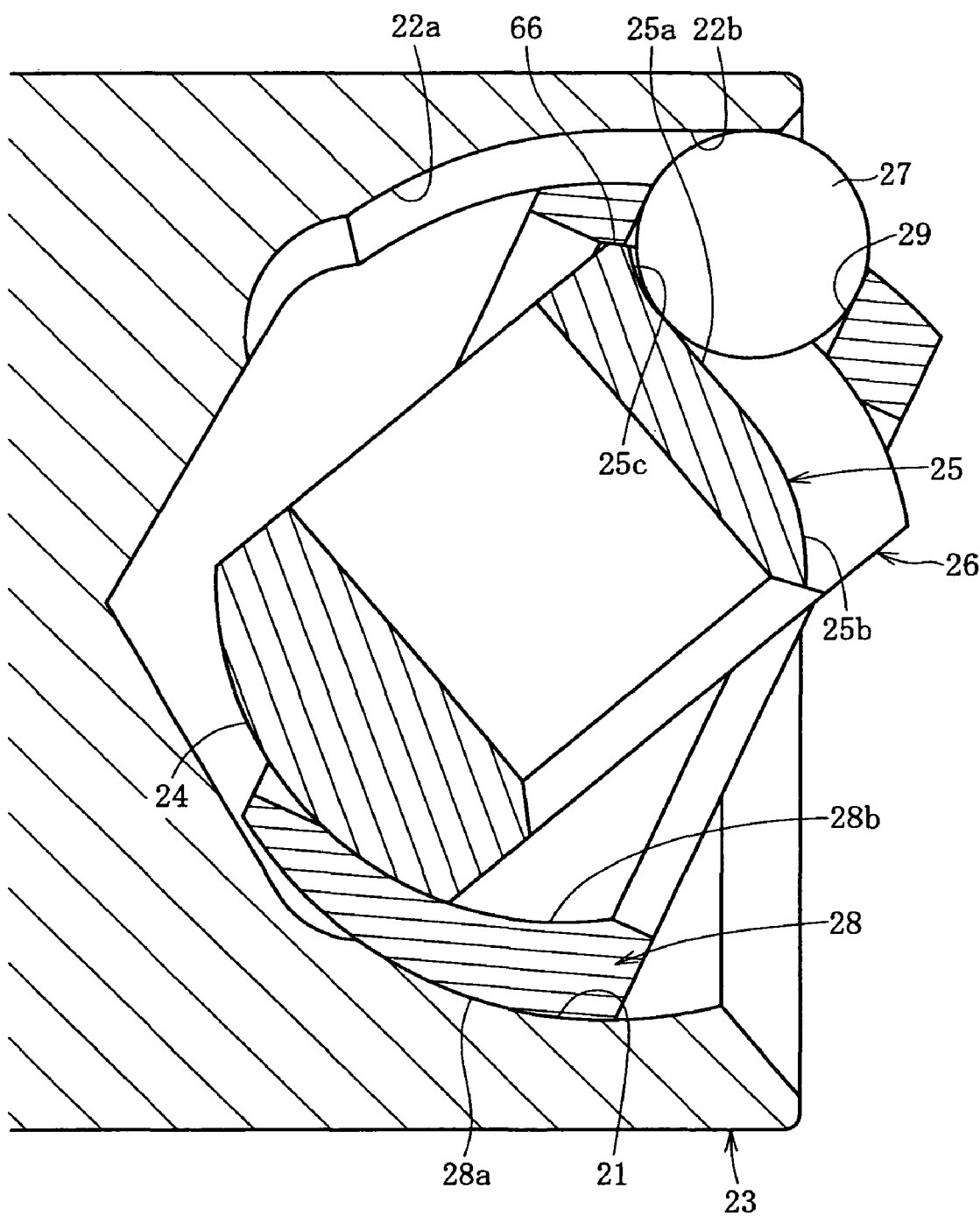
FIG. 32 is a cross-sectional view of when the fixed constant velocity universal joint is at an operating angle.
Figure 33:
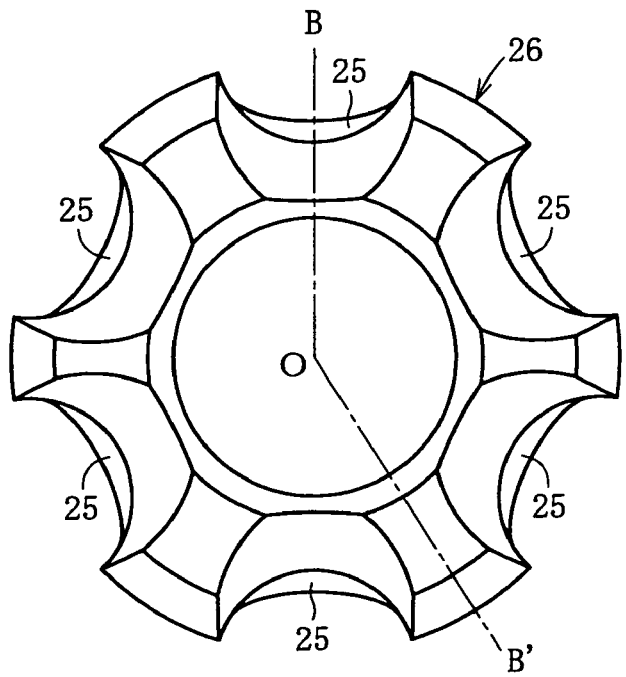
FIG. 33 is a front view of an inner ring in the fixed constant velocity universal joint.
Figure 36:
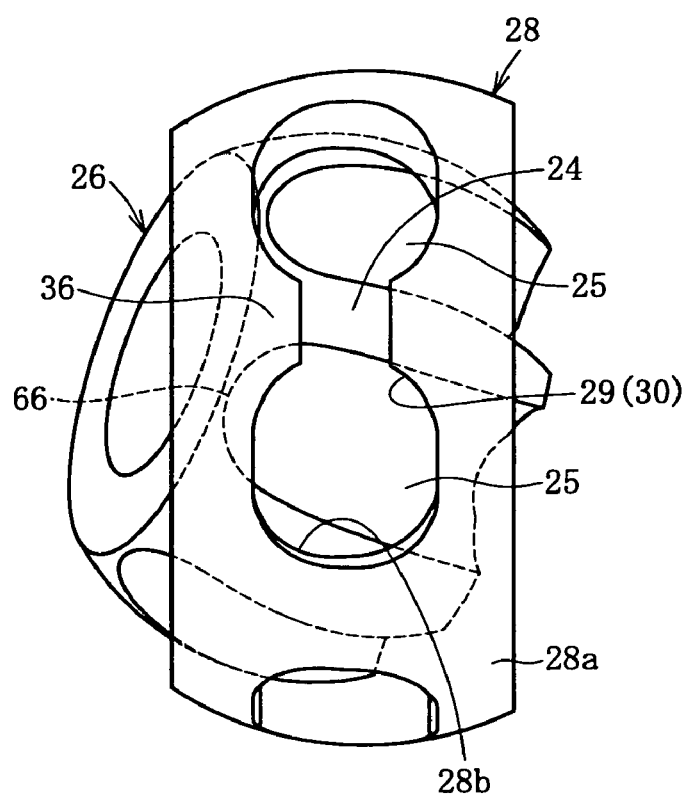
FIG. 36 is a perspective view of a relationship between the inner ring and a cage when the fixed constant velocity universal joint is at an operating angle.
Figure 37:
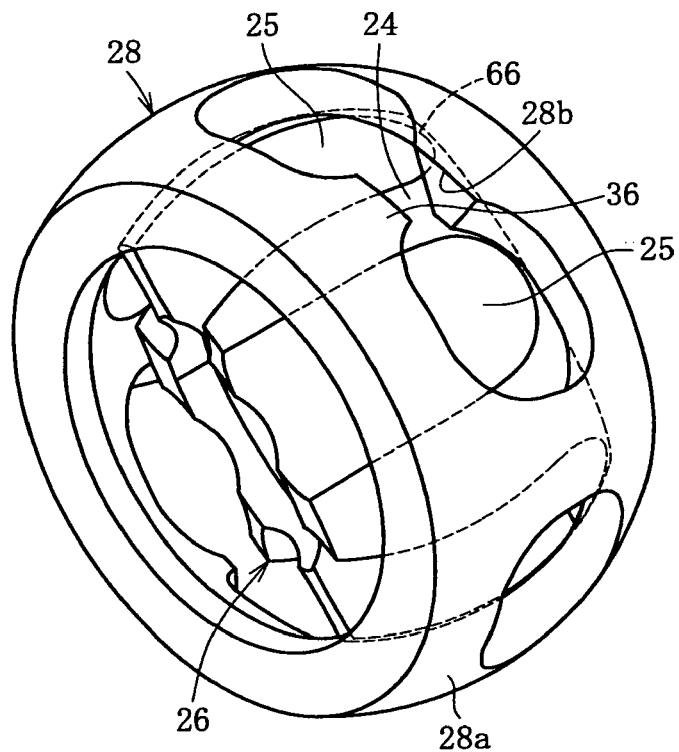
FIG. 37 is a perspective view of the relationship between the inner ring and the cage when the fixed constant velocity universal joint is at an operating angle, viewed from another direction.

Therefore, when the arc section 66 that is continuous in the circumferential direction is formed on the edge of the outer spherical surface 40 of the inner ring 26 on the joint inner side, as shown in FIG. 32, FIG. 36, and FIG. 37, the cage inner spherical surface 28b and the outer spherical surface 24 of the inner ring 26 are in constant contact even at a high angle.

Therefore, force applied to the cage window frames becomes balanced, and the deformation of the cage is reduced. In addition, the contact between the inner ring 26 and the cage 28 becomes continuous. In other words, because the inner ring 26 and the cage inner spherical surface 28b are in continuous contact even at a high operating angle, the contact area between the inner ring 26 and the cage inner spherical surface 28b increases, thereby reducing the contact surface pressure in this section. Friction, galling, burning, and the like can be prevented from occurring. As a result, malfunction of the joint, damage, temperature increase, burning, abnormal noises, and the like can be prevented.

Moreover, because the outer spherical surface 24 of the inner ring 26 and the cage inner spherical surface 28b are in contact even at a high operating angle, operational abnormalities and chipping of the edge of the window frame caused by interference between the edge (inner side edge) of the inner ring and the pocket frame (window frame) can be prevented. Damage at an early stage caused by operation malfunction of the joint and the cage chipping can be prevented. An axial direction length of the arc section 66 of the inner ring 26 can be arbitrarily set within a range that does not obstruct rolling of the balls 27 rolling over the track grooves 25.

According to the modified embodiment, the arc section 66 formed on the inner ring 26 continues along the overall periphery. However, the arc section 66 is not necessarily required to be formed for the track grooves 25 corresponding to the short pockets 31. In other words, all that is required is that the arc section 66 be provided for the track grooves 25 corresponding to the long pockets 30. This is because, as described earlier, issues regarding friction, galling, burning, and the like occur as a result of the long windows 30 being provided. When the arc section 66 is provided for only the track grooves 25 corresponding to the long pockets 30, the issues can be solved.

The invention claimed is:

1. A fixed constant velocity universal joint comprising:
an outer member having an inner spherical surface on which a plurality of track grooves are formed;
an inner member having an outer spherical surface on which a plurality of track grooves are formed;
a plurality of balls that are interposed between the track grooves on the outer member and the track grooves on the inner member and that transmit torque; and
a cage that has pockets housing the balls and that is interposed between the outer member and the inner member, wherein
the cage has four of the pockets including a pair of long pockets and a pair of short pockets, the long pockets having a circumferential direction spacing that is wider than a circumferential direction spacing of the short pockets, and each of the long pockets having opposing long sides, the pair of long pockets are shifted by 180 degrees along a circumferential direction and the pair of short pockets are shifted by 180 degrees along the circumferential direction, the long pockets and the short pockets are alternately disposed along the circumferential direction, each of the long pockets houses two of the balls and each of the short pockets houses one of the balls, and the cage has a plurality of projections, at least one of the projections projecting from one of the opposing long sides into each of the long pockets and forming two ball housing sections connected by a slit.

2. The fixed constant velocity universal joint according to claim 1, wherein the projections are provided on the long sides of the long pockets at a joint opening side.

3. The fixed constant velocity universal joint according to claim 2, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

4. The fixed constant velocity universal joint according to claim 1, wherein the projections are provided on the long sides of the long pockets at a joint inner side.

5. The fixed constant velocity universal joint according to claim 4, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

6. The fixed constant velocity universal joint according to claim 1, wherein a chamfer section is formed on at least one of edges of each of the long pockets on a cage outer spherical surface side and a cage inner spherical surface side.

7. The fixed constant velocity universal joint according to claim 6, wherein the chamfer sections are formed along an overall periphery of the long pockets.

8. The fixed constant velocity universal joint according to claim 7, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

9. The fixed constant velocity universal joint according to claim 6, wherein the chamfer sections are formed only on the long sides of the long pockets.

10. The fixed constant velocity universal joint according to claim 9, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

11. The fixed constant velocity universal joint according to claim 6, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

12. The fixed constant velocity universal joint according to claim 1, wherein a notched section that is not in contact with the inner spherical surface of the outer member is provided on a cage outer spherical surface.

13. The fixed constant velocity universal joint according to claim 12, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

14. The fixed constant velocity universal joint according to claim 1, wherein an arc section that is continuous in a circumferential direction is formed on an end of the outer spherical surface of the inner member on a joint inner side, in at least regions corresponding with the long pockets.

15. The fixed constant velocity universal joint according to claim 14, wherein the arc section continues over an overall periphery of the inner member in a circumferential direction.

16. The fixed constant velocity universal joint according to claim 14, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

17. The fixed constant velocity universal joint according to claim 1, wherein the balls are located along a pitch circle diameter (PCD) that passes through a center of each of the balls, a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees, and a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

18. The fixed constant velocity universal joint according to claim 1, wherein an axial direction length of the inner member is shorter than the circumferential direction spacing of the long pockets.

19. The fixed constant velocity universal joint according to claim 1, wherein a shoulder width dimension between two of the track grooves on the outer member corresponding to the long pockets in the cage is set to be smaller than a pocket width in a cage axial direction.

20. The fixed constant velocity universal joint according to claim 1, wherein a center of curvature of the track grooves on the outer member and a center of curvature of the track grooves on the inner member are each offset by a first offset amount k from a joint center in opposite axial directions, a center of curvature of an outer spherical surface of the cage and a center of curvature of an inner spherical surface of the cage are each offset by a second offset amount k2 from the joint center in opposite axial directions, and a relationship between the first offset amount k and the second offset amount k2 is defined by the following expression: $(k-k2)/k \leqq 0.3$.

* * * * *